US007188001B2

(12) United States Patent
Young et al.

(10) Patent No.: US 7,188,001 B2
(45) Date of Patent: Mar. 6, 2007

(54) SYSTEM AND METHOD FOR TEMPERATURE CONTROL

(75) Inventors: Steven J. Young, Los Altos, CA (US); Gregory T. A. Kovacs, Stanford, CA (US); M. Allen Northrup, Berkeley, CA (US); Kurt E. Petersen, San Jose, CA (US); William A. McMillan, Cupertino, CA (US); Konstantin Othmer, Mountain View, CA (US); Lee A. Christel, Palo Alto, CA (US)

(73) Assignee: Cepheid, Sunnyvale, CA (US)

( * ) Notice: Subject to any disclaimer, the term of this patent is extended or adjusted under 35 U.S.C. 154(b) by 401 days.

(21) Appl. No.: 10/353,186

(22) Filed: Jan. 27, 2003
(Under 37 CFR 1.47)

(65) Prior Publication Data

US 2004/0122559 A1 Jun. 24, 2004

Related U.S. Application Data

(63) Continuation-in-part of application No. 09/275,061, filed on Mar. 23, 1999, now abandoned, which is a continuation-in-part of application No. 09/046,420, filed on Mar. 23, 1998, now abandoned.

(51) Int. Cl.
  *G05B 21/00* (2006.01)
  *G01N 25/20* (2006.01)
  *G01N 21/00* (2006.01)
(52) U.S. Cl. .................. 700/266; 700/268; 700/274; 422/55; 422/62; 422/67; 422/68.1; 422/82.05; 422/105; 436/55; 436/147; 436/157; 436/164; 436/165; 436/166

(58) Field of Classification Search .................. 422/50, 422/55, 62, 67, 68.1, 82.05, 105, 108–109; 436/43, 50, 5, 147, 157, 164–166, 55, 174; 700/266, 268, 274
See application file for complete search history.

(56) References Cited

U.S. PATENT DOCUMENTS

| 4,007,425 | A | 2/1977 | Salisbury |
| 4,469,082 | A | 9/1984 | Nishitoba et al. |
| 4,474,015 | A | 10/1984 | Christmas et al. ............... 62/3 |
| 4,632,177 | A | 12/1986 | Beckey ....................... 165/239 |
| 4,810,653 | A | 3/1989 | Helfer et al. ............... 435/316 |
| 4,817,705 | A | 4/1989 | Levine et al. |
| 4,902,624 | A | 2/1990 | Columbus et al. .......... 435/316 |
| 4,933,535 | A | 6/1990 | Zabinski |
| 5,038,852 | A | 8/1991 | Johnson et al. |

(Continued)

*Primary Examiner*—Brian R. Gordon
(74) *Attorney, Agent, or Firm*—Townsend and Townsend and Crew LLP

(57) ABSTRACT

A system for controlling the temperature of a reaction mixture comprises at least one heating device for heating the mixture and a power regulator for regulating the amount of power supplied to the heating device. A controller in communication with the power regulator includes program instructions for heating the reaction mixture by setting a variable target temperature that initially exceeds a desired setpoint temperature for the mixture. When the heating device reaches a threshold temperature, the variable target temperature is decreased to the desired setpoint temperature. In another embodiment, the controller includes an adaptive control program for dynamically adjusting the duration or intensity of power pulses provided to the heating device.

41 Claims, 20 Drawing Sheets

U.S. PATENT DOCUMENTS

| | | |
|---|---|---|
| 5,180,896 A | 1/1993 | Gibby et al. |
| 5,266,778 A | 11/1993 | Bailey |
| 5,324,915 A | 6/1994 | Adams et al. |
| 5,333,675 A | 8/1994 | Mullis et al. |
| 5,360,594 A | 11/1994 | Meijer |
| 5,415,839 A | 5/1995 | Zaun et al. ............. 422/102 X |
| 5,460,780 A | 10/1995 | Devaney, Jr. et al. ......... 422/99 |
| 5,475,610 A | 12/1995 | Atwood et al. |
| 5,508,197 A | 4/1996 | Hansen et al. ........... 435/285.1 |
| 5,589,136 A | 12/1996 | Northrup et al. |
| 5,645,801 A | 7/1997 | Bouma et al. ............. 422/68.1 |
| 5,656,493 A | 8/1997 | Mullis et al. |
| RE35,716 E | 1/1998 | Stapleton et al. |
| 5,720,923 A | 2/1998 | Haff et al. ................. 422/68.1 |
| 5,792,427 A * | 8/1998 | Hugh et al. ................. 422/109 |
| 5,793,022 A | 8/1998 | Klinck et al. |
| 5,802,856 A | 9/1998 | Schaper et al. ............... 62/3.7 |
| 5,819,842 A | 10/1998 | Potter et al. ................ 165/206 |
| 5,849,208 A | 12/1998 | Hayes et al. .................. 216/94 |
| 5,866,883 A | 2/1999 | Hirai ......................... 219/544 |
| 5,922,591 A * | 7/1999 | Anderson et al. ......... 435/287.2 |
| 5,928,907 A | 7/1999 | Woudenberg et al. ..... 435/91.2 |
| 5,958,349 A | 9/1999 | Petersen et al. |
| 6,033,880 A | 3/2000 | Haff et al. ................. 435/91.1 |
| 6,043,080 A * | 3/2000 | Lipshutz et al. .......... 435/287.2 |
| 6,191,398 B1 * | 2/2001 | Peake et al. ................. 219/497 |
| 6,197,595 B1 * | 3/2001 | Anderson et al. ........... 436/180 |
| 6,296,809 B1 * | 10/2001 | Richards et al. .............. 422/64 |
| 6,403,037 B1 | 6/2002 | Chang et al. |
| 6,416,711 B2 * | 7/2002 | Weng ............................. 422/3 |
| 6,472,008 B2 * | 10/2002 | Weng ......................... 426/407 |
| 6,582,962 B1 * | 6/2003 | Richards et al. .............. 436/46 |
| 6,605,474 B1 * | 8/2003 | Cole .......................... 436/177 |
| 6,644,098 B2 * | 11/2003 | Cardinale et al. ........... 73/25.01 |
| 6,766,220 B2 * | 7/2004 | McRae et al. .............. 700/266 |
| 6,881,579 B2 * | 4/2005 | Hilson et al. ................. 436/47 |
| 2002/0001535 A1 | 1/2002 | Weng |
| 2002/0031446 A1 * | 3/2002 | Friedlander et al. ........ 422/68.1 |
| 2005/0048661 A1 * | 3/2005 | Droit et al. ................. 436/155 |
| 2005/0148084 A1 * | 7/2005 | Parce et al. ................... 436/50 |

\* cited by examiner

FIG. 13

SYSTEM AND METHOD FOR TEMPERATURE CONTROL

CONTINUING APPLICATION DATA

This application is a continuation-in-part of U.S. Ser. No. 09/275,061 filed Mar. 23, 1999 now abondoned which application is a continuation-in-part of U.S. Ser. No. 09/046,420 filed Mar. 23, 1998, now abandoned. All of these applications are incorporated by reference herein.

TECHNICAL FIELD OF THE INVENTION

The present invention relates generally to systems and methods for controlling the temperature of samples.

BACKGROUND OF THE INVENTION

There are many applications in the field of chemical processing in which it is desirable to precisely control the temperature of samples and to induce rapid temperature transitions. It is often desirable to control the temperature change in a manner that accurately attains the target temperature, avoids undershooting or overshooting of the temperature, and quickly reaches the target temperature. Such control of temperature may inhibit side reactions, the formation of unwanted bubbles, the degradation of components at certain temperatures, etc., which may occur at non-optimal temperatures.

Applications for heat-exchanging chemical reactions may encompass organic, inorganic, biochemical and molecular reactions, and the like. In organic and inorganic reactions, chemicals may be heated to achieve the activation energy for the reaction. Examples of thermal chemical reactions include isothermal nucleic acid amplification, thermal cycling amplification, such as polymerase chain reaction (PCR), ligase chain reaction (LCR), self-sustained sequence replication, enzyme kinetic studies, homogeneous ligand binding assays, and more complex biochemical mechanistic studies that require complex temperature changes. Temperature control systems also enable the study of certain physiologic processes where a constant and accurate temperature is required.

SUMMARY

The present invention relates generally to systems and methods for controlling the temperature of samples.

In accordance with an aspect of the present invention, a system for controlling the temperature of a reaction mixture contained in a reaction vessel comprises at least one heating device for heating the vessel, at least one temperature sensor, and at least one power regulator for regulating an amount of power supplied to the heating device. The system also includes at least one controller in communication with the power regulator and with the temperature sensor. The controller includes program instructions for heating the mixture by: (1) determining a level of power to be provided to the heating device, wherein the level of power is determined in dependence upon a variable target temperature that initially exceeds a desired setpoint temperature for the mixture; (2) sending a control signal instructing the power regulator to provide power to the heating device at the level determined; when the sensor measures a temperature greater than or equal to a threshold temperature, (3) decreasing the variable target temperature; (4) determining a new level of power to be provided to the heating device, wherein the new level of power is determined in dependence upon the decreased target temperature; and (5) sending a new control signal instructing the power regulator to provide power to the heating device at the new level.

In some embodiments, the system further comprises at least one optical detector in communication with the controller for generating optical data regarding the reaction mixture in the vessel. In some embodiments, the controller includes program instructions for processing the optical data and adjusting at least one process control selected from the group consisting of temperature control, completion of reaction, profile display, and signal generation regarding the need for addition of reagents. In some embodiments, the controller includes program instructions for adjusting thermal processing parameters in dependence upon the optical data. In some embodiments, the controller includes program instructions for processing the optical data and adjusting at least one optical detection parameter in dependence upon the optical data In accordance with another aspect of the invention, a method for using a heating device to heat a reaction mixture comprises the steps of: (a) determining a level of power to be provided to the heating device, wherein the level of power is determined in dependence upon a variable target temperature that initially exceeds a desired setpoint temperature for the mixture; (b) providing power to the heating device at the level determined; when the heating device reaches a temperature greater than or equal to a threshold temperature, (c) decreasing the variable target temperature; (d) determining a new level of power to be provided to the heating device, wherein the new level of power is determined in dependence upon the decreased target temperature; and (e) providing power to the heating device at the new level.

According to another aspect of the invention, a system for controlling the temperature of a reaction mixture contained in a reaction vessel comprises at least one heating device for heating the vessel, at least one cooling device for cooling the vessel, at least one temperature sensor, and at least one power regulator for regulating an amount of power supplied to the heating device. The system also includes at least one controller in communication with the cooling device, the power regulator, and the temperature sensor. The controller includes program instructions for cooling the mixture by: (1) setting a variable target temperature, wherein the variable target temperature is initially lower than a desired setpoint temperature for the mixture; (2) activating the cooling device to cool the mixture until the sensor measures a temperature less than or equal to a threshold temperature; (3) increasing the variable target temperature; (4) determining a level of power to be provided to the heating device in dependence upon the increased variable target temperature; and (5) sending a control signal instructing the power regulator to provide power to the heating device at the level determined.

According to another aspect of the invention, a system for controlling the temperature of a reaction mixture contained in a reaction vessel comprises at least one heating device for heating the vessel, at least one temperature sensor for measuring a temperature of the heating device, and at least one power regulator for regulating the amount of power supplied to the heating device. The system also comprises at least one memory for storing a pulse intensity value indicating an intensity of a power pulse to be supplied to the heating device to heat the heating device to a desired setpoint temperature. The memory also stores a pulse length value indicating a duration of the power pulse to be supplied to the heating device. The system further includes at least one controller in communication with the memory, the power regulator, and the temperature sensor. The controller includes program instructions for heating the reaction mixture by: (1) sending a control signal instructing the power regulator to provide the power pulse to the heating device at the intensity and for the duration indicated by the pulse intensity value and the pulse length value, respectively; (2) receiving temperature signals from the temperature sensor indicating measured temperatures of the heating device; (3) terminating the power pulse when the measured temperature of the heating device reaches a threshold value or when the duration of time indicated by the pulse length value has elapsed; and (4) adjusting the pulse length value or the pulse intensity value stored in the memory in dependence upon the difference between the setpoint temperature and the measured temperature of the heating device after the power pulse is completed.

In some embodiments, the system further includes at least one optical detector in communication with the controller for generating optical data regarding the reaction mixture in the vessel, and the controller includes program instructions for processing the optical data and adjusting at least one process control selected from the group consisting of temperature control, completion of reaction, profile display, and signal generation regarding the need for addition of reagents. In some embodiments, the system further includes at least one optical detector in communication with the controller for generating optical data regarding the reaction mixture in the vessel, and the controller includes program instructions for processing the optical data and adjusting at least one optical detection parameter.

According to another aspect of the invention, a system for thermally controlling a plurality of reaction mixtures contained in a plurality of reaction vessels comprises a plurality of heat-exchanging modules for receiving the vessels. Each of the modules comprises at least one heating device for heating one of the vessels and a temperature sensor for measuring the temperature of the heating device. The system also comprises at least one power regulator for regulating the amount of power supplied to the heating device of each heat-exchanging module. The system further comprises at least one memory for storing for each of the heat-exchanging modules a pulse intensity value indicating an intensity of a power pulse to be supplied to the heating device to heat the heating device to a desired setpoint temperature. The memory also stores a pulse length value indicating a duration of the power pulse to be supplied to the heating device. The system further includes at least one controller in communication with the memory, the power regulator, and with the temperature sensor of each heat-exchanging module. The controller includes program instructions for independently controlling each heat-exchanging module to heat a reaction mixture by: (1) sending a control signal instructing the power regulator to provide the power pulse to the heating device at the intensity and for the duration indicated by the pulse intensity value and the pulse length value, respectively, stored for the module; (2) receiving temperature signals from the temperature sensor indicating measured temperatures of the heating device; (3) terminating the power pulse when the measured temperature of the heating device reaches a threshold value or when the duration of time indicated by the pulse length value has elapsed; and (4) adjusting the pulse length value or the pulse intensity value stored in the memory in dependence upon the difference between the setpoint temperature and the measured temperature of the heating device after the power pulse is completed.

According to another aspect of the invention, a method for heating and optically interrogating a reaction mixture comprises the steps of: (a) storing in at least one memory a pulse length value indicating a duration of a power pulse to be supplied to a heating device to heat the reaction mixture to a desired setpoint temperature and a pulse intensity value indicating an intensity of the power pulse to be supplied to the heating device; (b) sending a control signal instructing a power regulator to provide the power pulse to the heating device at the intensity and for the duration indicated by the pulse intensity value and the pulse length value, respectively; (c) receiving temperature signals from a sensor indicating measured temperatures of the heating device; (d) terminating the power pulse when the measured temperature of the heating device reaches a threshold value or when the duration of time indicated by the pulse length value has elapsed; (e) adjusting the pulse length value or the pulse intensity value stored in the memory in dependence upon the difference between the setpoint temperature and the measured temperature of the heating device after the power pulse is completed; (f) generating optical data regarding the reaction mixture; and (g) processing the optical data and adjusting at least one process control selected from the group consisting of temperature control, completion of reaction, profile display, and signal generation regarding the need for addition of reagents.

According to another aspect of the invention, a method for heating and optically interrogating a reaction mixture comprises the steps of: (a) storing in at least one memory a pulse length value indicating a duration of a power pulse to be supplied to a heating device to heat the reaction mixture to a desired setpoint temperature and a pulse intensity value indicating an intensity of the power pulse to be supplied to the heating device; (b) sending a control signal instructing a power regulator to provide the power pulse to the heating device at the intensity and for the duration indicated by the pulse intensity value and the pulse length value, respectively; (c) receiving temperature signals from a sensor indicating measured temperatures of the heating device; (d) terminating the power pulse when the measured temperature of the heating device reaches a threshold value or when the duration of time indicated by the pulse length value has elapsed; (e) adjusting the pulse length value or the pulse intensity value stored in the memory in dependence upon the difference between the setpoint temperature and the measured temperature of the heating device after the power pulse is completed; (f) generating optical data regarding the reaction mixture; and (g) processing the optical data and adjusting at least one optical detection parameter.

According to another aspect of the invention, a method for thermally controlling a plurality of reaction mixtures contained in a plurality of reaction vessels comprises the steps of: (a) placing the reaction vessels into a corresponding plurality of heat-exchanging modules, wherein each of the modules comprises at least one heating device for heating one of the vessels and at least one temperature sensor for measuring the temperature of the heating device; (b) for each of the heat-exchanging modules, storing in at least one memory a pulse length value indicating a duration of a power pulse to be supplied to the heating device of the module to heat the heating device to a desired setpoint temperature and a pulse intensity value indicating an intensity of the power pulse to be supplied to the heating device; (c) independently controlling each heat-exchanging module to heat the reaction mixture contained therein by: (1) sending a control signal instructing a power regulator to provide the power pulse to the heating device at the intensity and for the duration indicated by the pulse intensity value and the pulse length value, respectively, stored for the module; (2) receiving temperature signals from the sensor indicating measured temperatures of the heating device; (3) terminating the power pulse when the measured temperature of the heating device reaches a threshold value or when the duration of time indicated by the pulse length value has elapsed; and (4) adjusting the pulse length value or the pulse intensity value stored in the memory in dependence upon the difference between the setpoint temperature and the measured temperature of the heating device after the power pulse is completed.

BRIEF DESCRIPTION OF THE DRAWINGS

FIGS. 11–13 are a series of sample graphic displays viewable on the user's computer monitor according to the present invention.

FIG. 11 illustrates a Program Menu Screen through which site profiles are created and can be executed.

FIG. 12 illustrates an Instrument Menu Screen that displays current thermal cycling status.

FIG. 13 illustrates a Library Menu Screen through which profiles and results are callable for loading and, in the case of profiles, executed for instrument operation, or in the case of results, executed with respect to printing in reports and/or forwarding to other clients.

DETAILED DESCRIPTION

Figure 1:
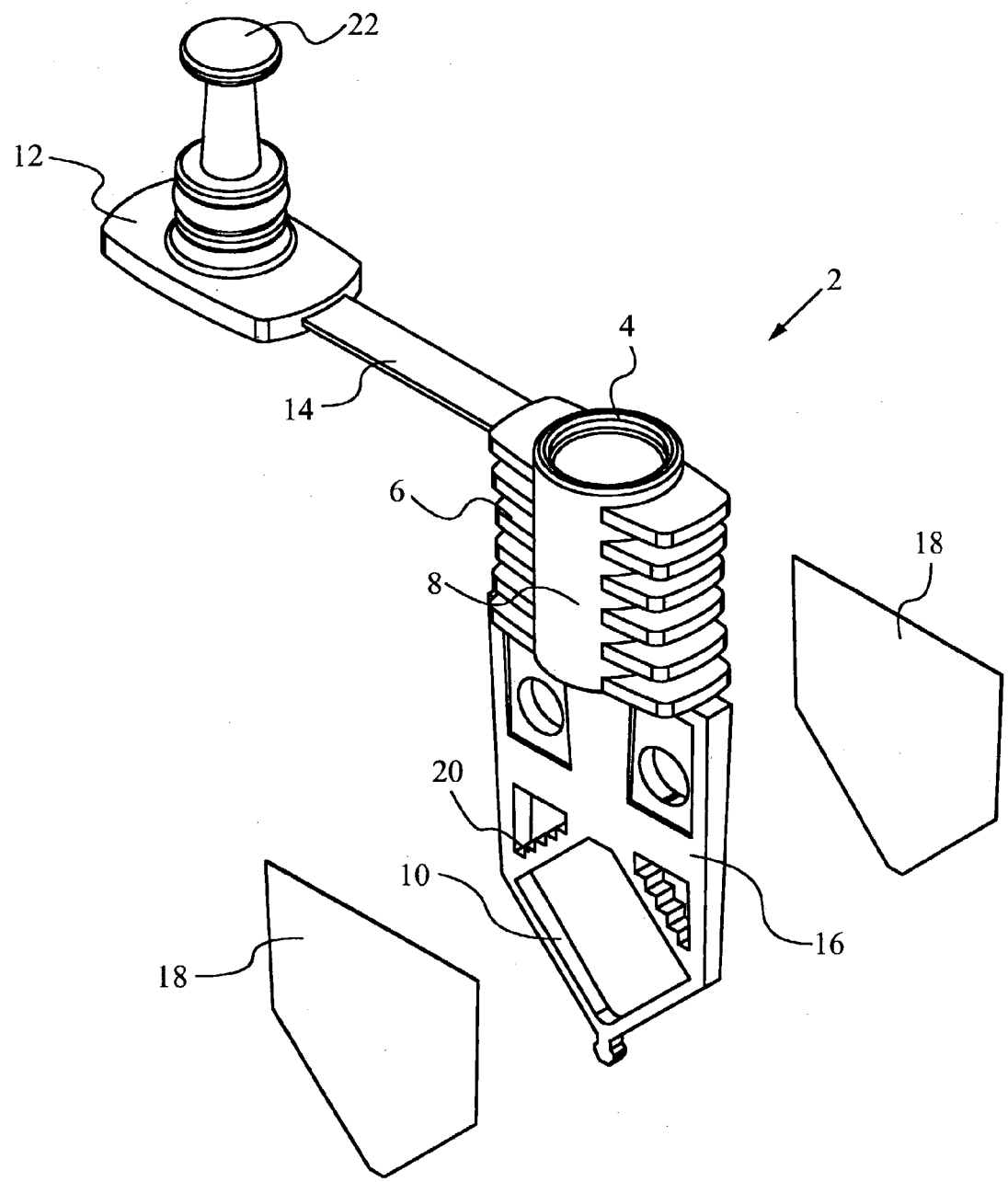
FIG. 1 shows a partially exploded, perspective view of a reaction vessel in which two of the reaction chamber walls are removed to show the interior of the chamber.

In a preferred embodiment, the present invention provides a multi-site reactor system having dynamic, independent, computer-implemented control of each reaction site. The system permits different thermal profiles to be performed at different reaction sites simultaneously. In addition, individual sites may be loaded/unloaded at different times without interfering with operations of other sites. Each of the individual sites can have a unique site program assigned to it. The site program may be initiated at any time, monitored continuously, and the results fully recorded. The system provides for extremely rapid temperature changes of reaction mixtures in a manner that accurately attains the target temperature and that avoids undershooting or overshooting of the temperature. The system is therefore useful in thermally sensitive chemical processes, such as polymerase chain reaction (PCR), ligase chain reaction (LCR), self-sustained sequence replication, enzyme kinetic studies, homogeneous ligand binding assays, and more complex biochemical mechanistic studies that require complex temperature changes.

In preferred embodiments of the present invention, a system for controlling the temperature of a reaction mixture contained in a reaction vessel includes at least one heating device for heating the vessel. In general, suitable heating devices include conductive heaters, convection heaters, or radiation heaters. Examples of conductive heaters include resistive or inductive heaters, e.g., electric heaters or thermoelectric devices. Suitable convection heating devices include forced air heaters or fluid heat-exchangers (e.g., a heat-conducting block having flow channels so that the block may be heated or cooled by liquid flowing through the channels). Suitable radiation heaters include infrared or microwave heaters. Similarly, in embodiments in which the system includes a cooling device, various cooling devices may be used. For example, various convection cooling devices may be employed such as a fan, Peltier device, refrigeration device, or jet nozzle for flowing cooling fluids. Alternatively, various conductive cooling devices may be used, such as a heat sink, e.g. a cooled metal block.

In preferred embodiments, the heating device comprises a heat-conducting body (e.g., a thermally conductive plate or metal block) and a heating element coupled to the body. The supply of electricity to the heating element heats the heating element which heats the heat-conducting body which in turn heats the reaction vessel. In a particularly preferred embodiment, the heating device comprises at least one plate and a resistive heating element coupled to the plate. More preferably, the heating device comprises two plates between which the vessel is sandwiched and respective heating elements coupled to the plates.

The system also includes at least one temperature sensor. The sensor is preferably positioned to measure a temperature of the heating device. For example, in embodiments in which the heating device comprises a heat-conducting body and a heating element coupled to the body, the temperature sensor measures the temperature of the heat-conducting body. Alternatively, the sensor may be positioned to measure the temperature of the reaction vessel or the temperature of a substance (e.g., air or fluid) proximal the vessel. For example, if the heating device is a forced-air heater, then the temperature sensor may be positioned to measure the temperature of the air. As another example, if the heating device incorporates a fluid reservoir and channels for the flow of heated fluid, the temperature sensor may be positioned to measure the temperature of the fluid.

The system further includes a controller, such as a microprocessor, personal computer, or network computer, for controlling the operation of the heating device using temperature feedback from the temperature sensor. In a first embodiment, the controller includes an adaptive control program for dynamically adjusting the duration or intensity of power pulses provided to the heating device to attain target temperatures quickly and accurately without overshooting or undershooting the target. In a second embodiment, the controller includes an improved proportional-integral-derivative (PID) control program that compensates for thermal lag between a reaction mixture and the heating or cooling device that heats or cools a vessel containing the mixture.

Figure 2:
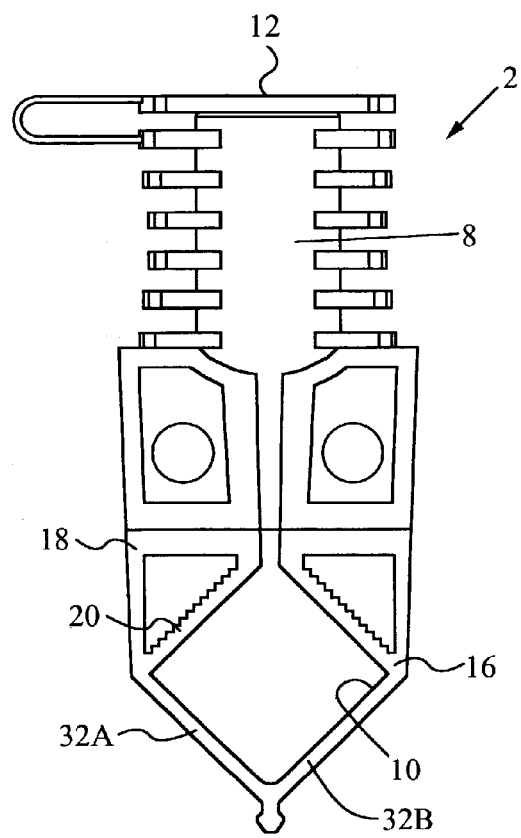
FIG. 2 is a front view of the vessel of FIG. 1.

FIGS. 1–19 illustrate a first embodiment of the multi-site reactor system. FIG. 1 shows a partially exploded view of a reaction vessel 2, and FIG. 2 shows a front view of the vessel. The vessel 2 includes a reaction chamber 10 for holding a reaction mixture, e.g., a fluid sample mixed with chemicals or reagents, for reaction. The sample may be an aqueous solution or suspension containing particles, cells, microorganisms, ions, or small and large molecules, such as proteins and nucleic acids, etc. In a particular use, the sample may be a bodily fluid, e.g., blood or urine, or a suspension, such as pulverized food. The sample may be pretreated, for example, mixed with chemicals, centrifuged, pelleted, etc., or the sample may be in a raw form.

The vessel 2 is designed for optimal thermal conductance and for efficient optical viewing of the reaction product. The thin shape of the vessel contributes to optimal thermal kinetics by providing large surfaces for thermal conduction and for contacting the thermal plates. In addition, the minor or major walls of the vessel provide windows into the chamber so that the entire reaction mix can be optically interrogated.

In more detail to FIGS. 1–2, the reaction vessel 2 includes a rigid frame 16 that defines the perimeter of the reaction chamber 10. The frame 16 also includes a port 4 and a channel 8 that connects the port to the reaction chamber 10. Thin, flexible walls 18, shown in FIG. 1 exploded from the frame 16, are coupled to opposite sides of the frame to form the sidewalls of the chamber 10. The walls 18 facilitate optimal thermal conductance to the reaction mixture contained in the chamber 10. The flexible nature of the walls 18 allows for maximum contact with thermal plates. The walls are conformable to the surface of the plates in a manner that avoids or minimizes gaps between surfaces.

Figure 3:
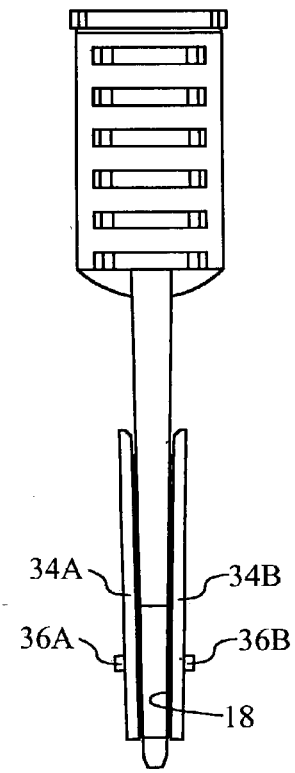
FIG. 3 is a side view of the vessel of FIG. 1 inserted in a thermal sleeve formed by opposing plates.

FIG. 3 shows contact between the reaction vessel and a pair of opposing thermal plates 34A, 34B. At least one of the plates, and preferably both, includes a heating element, such as a resistor, for heating the reaction mixture in the vessel. The plates 34A, 34B also preferably include temperature sensors, such as thermistors 36A, 36B. When the vessel 2 is inserted between the plates, the inner surfaces of the plates contact walls 18. In this position, minimal or no gaps are found between the plate surfaces and the walls 18 of the reaction chamber. For optimal thermal conductance, the thickness of each wall 18 is preferably between about 0.0001 to 0.020 inch, more preferably 0.0005 to 0.005 inch, and most preferably 0.001 to 0.003 inch. In order to achieve this thinness, the wall may be a film, sheet, or a molded, machined extruded or cast piece, or other convenient thin and flexible structure.

The material composing the walls 18 and frame 16 may be a polyalcohol including polypropylene, polyethylene, polyester, and other polymers, laminates or homogenous polymers, metals or metal laminates, or other materials which may be thin, flexible, conformable and permit high heat transfer and is preferably in the form of a film or sheet. Where the frame of the chamber which supports the sidewalls is a particular material, such as polypropylene, the sidewalls are preferably the same material, such as polypropylene, so that the heat expansion and cooling rates of the walls are the same as the frame.

The thermal plates 34A, 34B may be made of various materials including ceramics or metals such as aluminum nitride, aluminum oxide, beryllium oxide, and silicon nitride. Other materials which may be utilized include, e.g., gallium arsenide, silicon, silicon nitride, silicon dioxide, quartz, glass, diamond, polyacrylics, polyamides, polycarbonates, polyesters, polyimides, vinyl polymers, and halogenated vinyl polymers, such as polytetrafluoroethylenes. Other possible materials include thermocouple materials such as chrome/aluminum, superalloys, zircaloy, aluminum, steel, gold, silver, copper, tungsten, molybdenum, tantalum, brass, sapphire, or any of the numerous ceramics, metals, and synthetic polymeric materials available in the art.

Ceramic plates are presently preferred because the inside surfaces may be conveniently machined to very high smoothness for high wear resistance, high chemical resistance, and good thermal contact to reaction vessels. Ceramic plates can also be made very thin (between 0.635 and 1.25 mm) for low thermal mass. A heat exchanging plate made from aluminum or copper also has high thermal conduction, but a larger thermal mass.

The heating elements coupled to the plates 34A, 34B, such as heating resistors, may be directly screen printed onto a plate, particularly plates comprising ceramic insulating materials, such as aluminum nitride and aluminum oxide. Screen-printing provides high reliability and low cross-section for efficient transfer of heat into the reaction chamber. The heating element may also be baked inside of the ceramic plate. Also, thick or thin film resistors of varying geometric patterns may be disposed on the plate walls to provide more uniform heating, for example by having thicker resistors at the extremities and thinner resistors in the middle. Heating elements may consist of carbide, tungsten, silver, or other materials that heat when a voltage is applied to the material. One way of heating a metal sleeve is by using a laminated heater source such as an etched-foil heating element (Minco Products, located in Minneapolis, Minn.) attached to the surface of the heating plates.

Referring again to FIGS. 1–2, the reaction vessel 2 also preferably includes a seal cap 12. The cap 12 may be conveniently attached to the frame 16 by a flexible arm 14. The cap 12 includes a piston or plug 22 that is inserted into the channel 8 when the cap 12 is placed on the vessel 2. When inserted into the channel 8, the piston 22 pressurizes the chamber 10, thereby expanding the flexible walls 18. The expansion of the walls 18 provides for increased conformity between the walls 18 and the surfaces of the thermal plates.

In using the reaction vessel 2, a sample is added to the reaction chamber 10 through the port 4. This may be accomplished by inserting a pipette tip through the channel 8 into the interior of the chamber 10 and filling the chamber 10 from the bottom up. Alternatively, the sample may be added through automated fluid injection, or through a fluidic manifold which optionally is an integral part of the reaction vessel. For manual addition of the sample, the vessel 2 preferably includes finger grips 6.

The sample may be mixed with reagents prior to being added to the chamber 10. Alternatively, the sample may be introduced to reagents in the chamber 10. As shown in FIG. 3, the walls 18 of the chamber are made to press against the thermal plates 34A, 34B, and the walls conform to the plate surfaces. The reaction mixture is exposed to variations in temperature by activating the heating elements on the plates 34A, 34B. The reaction products are then optically viewed, preferably through the bottom walls 32A, 32B of the frame 16, as shown in FIG. 2. For this reason, the frame 16 should be made of an optically transmissive material, e.g., a polycarbonate or polypropylene. The frame 16 also preferably includes reflective faces 20 which bounce back light transmitted from the chamber 10, allowing for increased detection of signal.

The reaction vessel 2 may be fabricated by first molding the rigid frame 16 to form a chamber having open sides. The frame 16 is preferably made by standard injection molding processes. After the frame is made, the sidewalls 18 are produced by placing and preferably stretching material, e.g., thin films or sheets of polypropylene, over the chamber area. The walls 18 are then attached to opposite sides of the frame 16. Where the walls are a film or sheet, the material may be attached to the frame by heat-sealing, adhesive bonding, ultrasonic bonding, etc.

The reaction vessel may be sized, in particular in the chamber, to contain volumes from nanoliters to milliliters, depending upon the desired use. For nucleic acid amplification, the volume of the chamber is preferably in the range of 25 to 110 microliters. Further, the reaction chamber 10 is preferably thin, e.g., having a thickness of 1–2 mm or less, for high thermal conductance of heat to a reaction mixture in the chamber. In one specific embodiment, the reaction chamber 10 is a diamond-shaped chamber having sides of length 10 mm, a thickness of 1 mm, and a volume of about 100 microliters.

Figure 4:
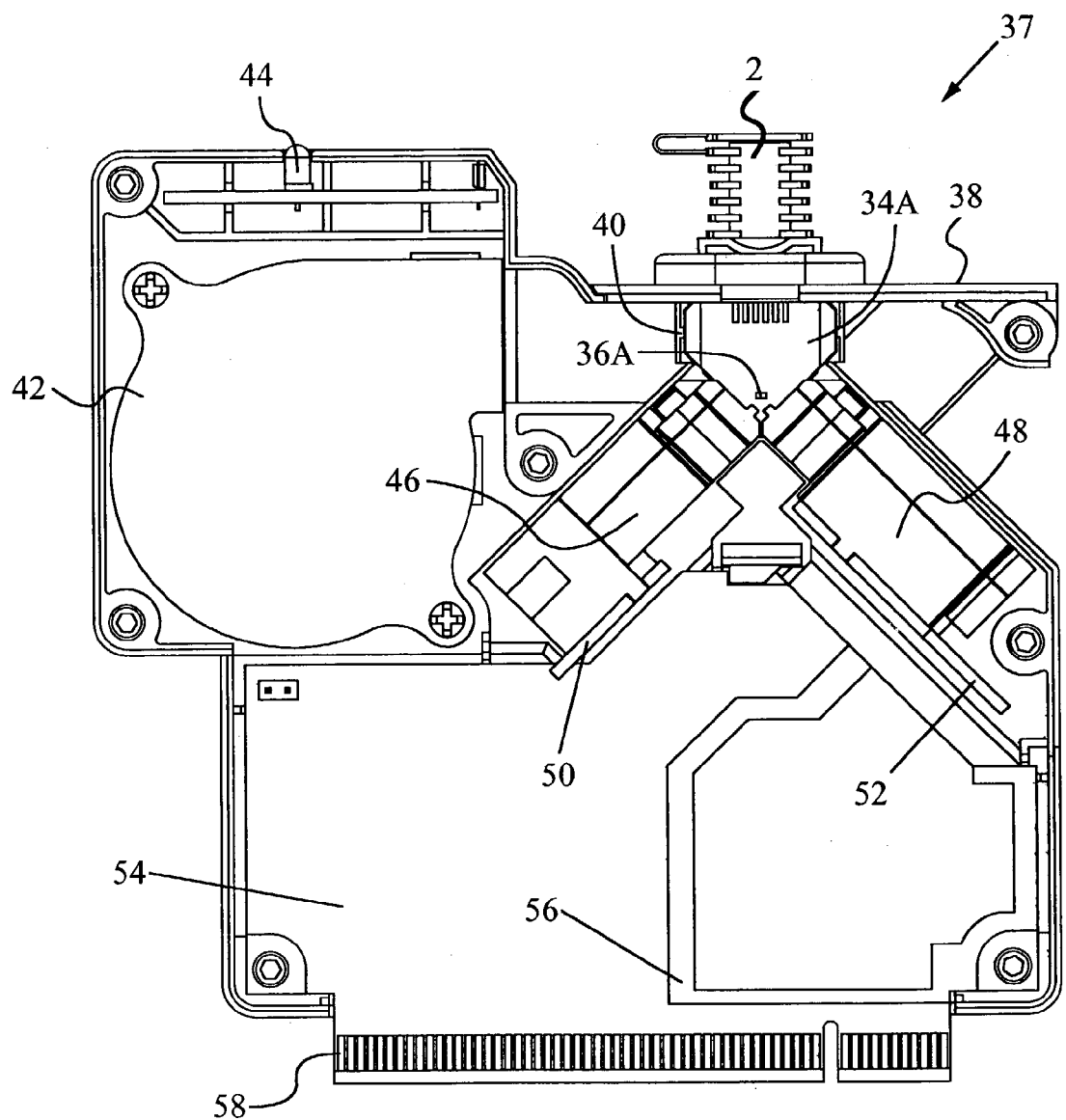
FIG. 4 is a schematic, side view of a heat-exchanging module according to the present invention having a thermal sleeve, optics assemblies coupled to circuit boards, and a cooling system. A reaction vessel is inserted in the thermal sleeve.

FIG. 4 shows a heat-exchanging module 37 for receiving the reaction vessel 2. The heat-exchanging module 37 preferably includes a housing 38 for holding the various components of the module. The module 37 also includes the thermal plates 34A, 34B described above (only plate 34A shown in the view of FIG. 4). The plates may be held in an opposing relationship to each other by means of one or more brackets, supports, or retainers. Additionally, the plates may be spring-biased towards each other as described in U.S. application Ser. No. 09/194,374 filed Nov. 24, 1998. The housing 38 includes a slot above the plates 34A, 34B so that the vessel 2 may be inserted through the slot and between the plates.

The heat-exchanging module 37 also preferably includes a cooling device, such as a fan 42, for cooling the reaction mixture in the vessel 2. When the vessel 2 is between the plates 34A, 34B, the reaction chamber is cooled by the air circulating from the fan. Alternatively, the cooling device may be a Peltier device or a channel for carrying a refrigerant or compressed gas to the reaction vessel. These and other cooling devices are well known in the art.

The heat-exchanging module 37 further includes an optical excitation assembly 46 and an optical detection assembly 48. The excitation assembly 46 includes a first circuit board 50 for holding its electronic components, and the detection assembly 46 includes a second circuit board 52 for holding its electronic components. The excitation assembly 46 includes one or more light sources, preferably LEDs, for exciting a fluorescent indicating dye in the vessel 2. The excitation assembly 46 also includes one or more lenses for focusing and collimating the light from the light source, as well as filters for selecting the excitation wavelength(s) of interest.

The detection assembly 48 includes one or more detectors, preferably photodiodes, for monitoring the fluorescence emitted from the mixture in the vessel 2. The detection assembly 48 also includes one or more lenses for focusing and collimating the emitted light, as well as filters for selecting the emission wavelength(s) of interest. A suitable pair of optical assemblies for use in the system of the present invention is disclosed in U.S. application Ser. No. 09/081, 260 filed May 19, 1998, the disclosure of which is incorporated by reference herein. For improved detection, the module 37 preferably includes a light-tight lid (not shown) that is placed over the top of the reaction vessel 2 and sealed to the housing 38 after the vessel is inserted between the plates 34A, 34B.

Although LEDs and photodiodes are presently preferred in the optics of module 37, many other optical detection schemes may be employed. For example, in another embodiment, the optics include an optical filter, such as an interference filter or band pass filter for passing the detection wavelength of interest, a CCD, focusing optics, a reflector/splitter, and an Argon ion laser. The operation is as follows: The laser excites the fluorescent indicator dye in the vessel 2. The fluorescent signal is monitored by the CCD. Absorption spectroscopy could similarly be used.

The housing 38 may be molded from a rigid, high-performance plastic, or other conventional materials. The primary functions of the housing 38 are to provide a frame for holding the plates 34A, 34B and optics assemblies 46, 48 and to provide flow channels and ports for directing cooling fluid, e.g. air, and efficiently guiding the fluid flow across the surface of the plates 34A, 34B and reaction vessel 2.

The heat-exchanging module 37 also includes a PC board 54 for holding the electronic components of the module and an edge connector 58 for connecting the module 37 to a base instrument, as will be described below with reference to FIG. 5. The heating elements and thermistors 36A, 36B on the plates 34A, 34B, as well as the optical boards 50, 52, are connected to the PC board 54 by flex cables (not shown in FIG. 4 for clarity of illustration).

The module 37 may also include a grounding trace 56 for shielding the optical detection circuit. The module 37 also preferably includes an indicator, such as an LED 44, for indicating to a user the current status of the module such as "ready to load sample", "ready to load reagent," "heating," "cooling," "finished," or "fault".

Figure 5:
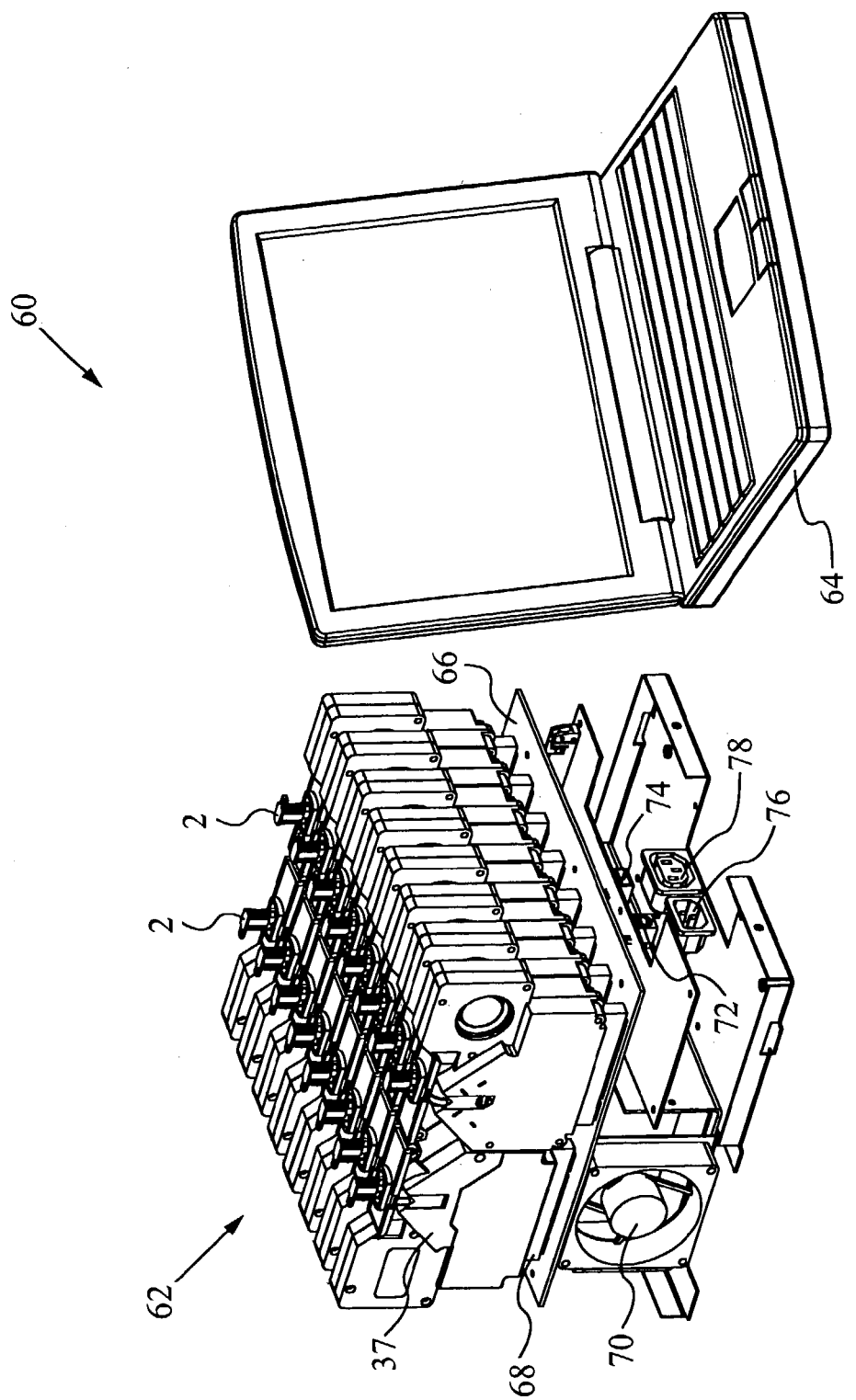
FIG. 5 is a perspective view of a multi-site reactor system having dynamic, independent, computer-implemented control of each reaction site.
Figure 6:
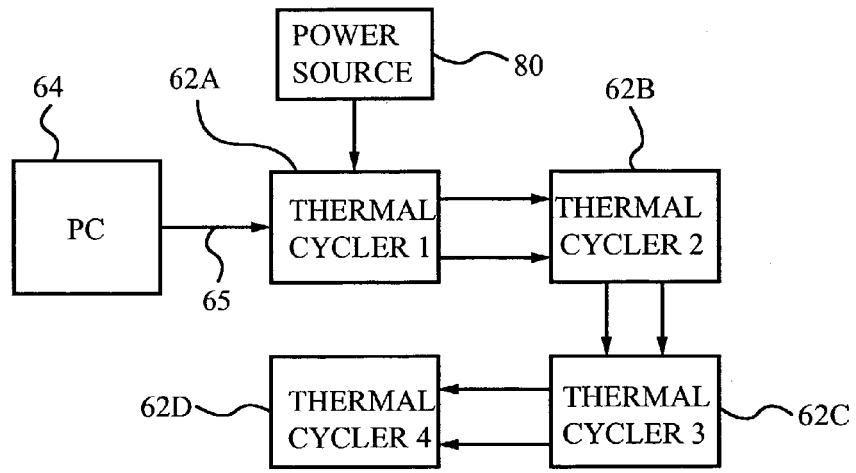
FIG. 6 is a schematic, block diagram of another multi-site reaction system according to the present invention comprising multiple thermal cycling instruments daisy-chained to a computer.

FIG. 5 is a perspective view of a multi-site reactor system comprising a thermal cycler 62 and a controller, such as a personal computer 64. The thermal cycler 62 comprises a base instrument 66 and multiple heat-exchanging modules 37. The base instrument 66 has a main logic board with edge connectors 68 for receiving the modules 37. The base instrument 66 also preferably includes a fan 70 for cooling its electronic components. The base instrument 66 may be connected to the controller 64 using any suitable data connection, such as a universal serial bus (USB), ethernet connection, or serial line. It is presently preferred to use a USB that connects to the serial port of computer 64. Although a laptop computer is shown in FIG. 5, the controller may comprise any type of device having a processor. Further, the thermal cycler may be linked to a computer network rather than to a single computer.

The term "thermal cycling" is herein intended to mean at least one change of temperature, i.e. increase or decrease of temperature, in a reaction mixture. Therefore, chemicals undergoing thermal cycling may shift from one temperature to another and then stabilize at that temperature, transition to a second temperature or return to the starting temperature. The temperature cycle may be performed only once or may be repeated as many times as required to study or complete the particular chemical reaction of interest.

In the specific embodiment of FIG. 5, the thermal cycler 62 includes sixteen independently-controllable heat-exchanging modules 37 arranged in two rows of eight modules. It is to be understood, however, that the thermal cycler can range from two to four-site hand-held instruments to multi-hundred site clinical and research instruments. Common to all these embodiments are multiple, independently-controllable modules 37, and a controller 64 for operating individually programmed independent temperature/time-profiles for each module. In a research instrument, experiments can be done in a single pass that simultaneously investigate variations in temperatures, times at each temperature, temperature ramp rates, chemistries, sensing means (optical or other interrogation methods), etc. The thermal time-courses for nucleic acid amplifications or other reactions can be fine tuned to a particular target, and independent control of individual modules 37 permits simultaneous reactions to be run at different thermal profiles.

The thermal cycler 62 also provides for independent loading, cycling, and unloading of individual sites at different times allowing for optimal use and throughput. This fully-independent access to individual modules 37 permits only the necessary number of modules be used at a given time. The thermal cycler 62 is also modular, in that each heat-exchanging module 37 (with or without its associated electronics and electro-optics) can be individually removed from the base instrument 66 for servicing, repair or replacement. This modularity reduces downtime in that all the modules 37 are not off line to repair one, and the instrument 66 can be upgraded and enlarged to add more sites as needed.

The modularity of the thermal cycler 62 also means that individual modules 37 can be precisely calibrated, and site-specific schedules or corrections, e.g. compensating power pulse and cooling on/off times, can be included in the control programs, e.g., as a series of site-specific calibration or adjustment charts, to be sure temperature profiles are followed.

The independent thermal cycling system 62 of the invention also has significant advantages in terms of power management. The controller 64 can interleave the thermal profiles of each independent module 37 to save power as compared to a single block heater. For example, current can be reduced by half by control of one module to heat (high power) while a second module is cooling (low power). Thus, by interleaving of pulse power to only so many modules 37 as have reactants in them, the instantaneous current requirements for the base instrument 66 can be minimized, permitting more modules 37 per instrument that can still be powered from a standard 110V, 15 ampere circuit. Because of this sophisticated power management system, which is made possible by the independent control of the modules 37, the instrument 66 may be configured into a hand-held, battery operated device.

In embodiments in which the base instrument 66 operates on external power, e.g. 110 V AC, the instrument preferably includes two power connections 76, 78. Power is received though the first connection 76 and output through the second connection 78. Similarly, the instrument 66 preferably includes network interface inlet and outlet ports 72, 74 for receiving a data connection through inlet port 72 and outputting data to another base instrument through outlet port 74. As shown schematically in FIG. 6, this arrangement permits multiple thermal cyclers 62A, 62B, 62C, 62D to be daisy-chained from one controller 64 and one external power source 80. Using a USB, it is theoretically possible to daisy-chain 127 thermal cycler instruments to a single controller, although due to limits of computing power, one should have more than one computer for controlling 127 instruments.

Figure 7:
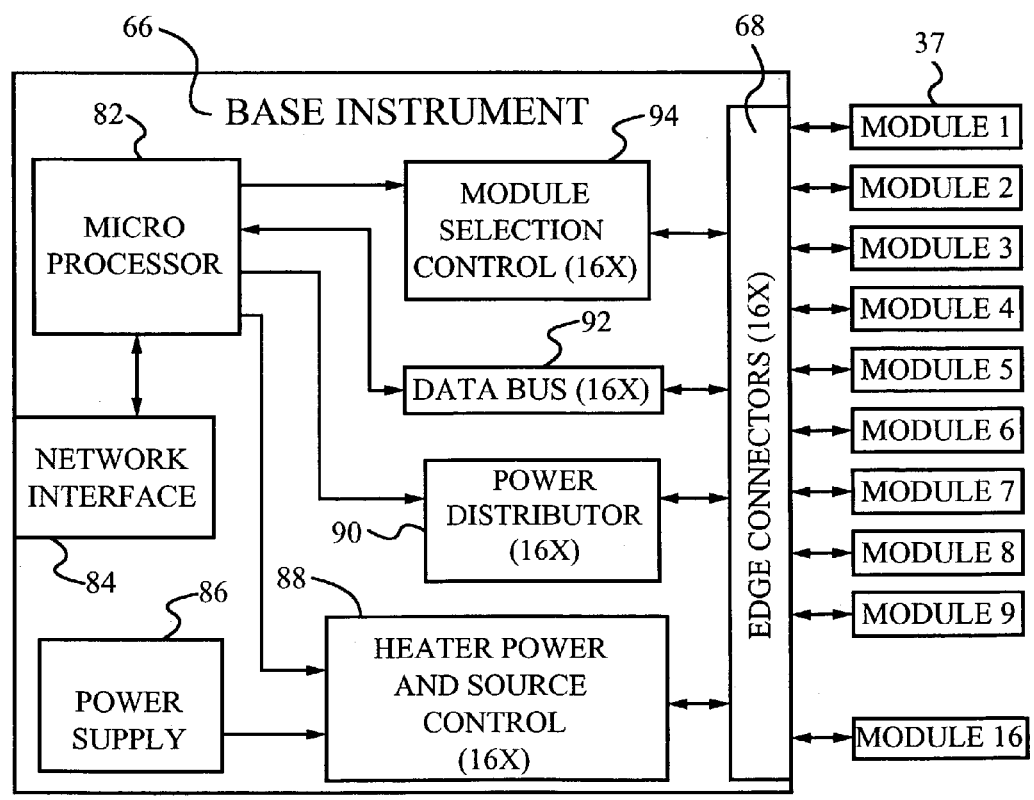
FIG. 7 is a schematic, block diagram of a base instrument of the system of FIG. 5.

FIG. 7 is a schematic, block diagram of the base instrument 66. The base instrument includes a power supply 86 for supplying power to the instrument and to each module 37. The power supply 86 may comprise an AC/DC converter for receiving power from an external source and converting it to direct current, e.g., receiving 110V AC and converting it to 12V DC. Alternatively, the power supply 86 may comprise a battery, e.g., a 12V battery.

The base instrument 66 also includes a microprocessor or microcontroller 82 containing firmware for controlling the operation of the base instrument 66 and modules 37. The microcontroller 82 communicates through a network interface 84 to a user interface computer via a USB. Due to current limitations of processing power, it is currently preferred to include at least one microcontroller in the base instrument per sixteen modules. Thus if the base instrument has a thirty-two module capacity, one should install two microcontrollers in the instrument to control the modules.

The base instrument further includes a heater power source and control circuit 88, a power distributor 90, a data bus 92, and a module selection control circuit 94. Due to space limitations in patent drawings, control circuit 88, power distributor 90, data bus 92, and control circuit 94 are shown only once in the schematic diagram of FIG. 7. However, the base instrument 66 actually contains one set of these four functional components 88, 90, 92, 94 for each heat-exchanging module 37. Thus, in the embodiment of FIG. 7, the base instrument 66 includes sixteen control circuits 88, power distributors 90, data buses 92, and control circuits 94.

Similarly, the base instrument 66 also includes one edge connector 68 for each module 37 so that the instrument includes sixteen edge connectors for the embodiment shown in FIG. 7. The edge connectors are preferably 120 pin card edge connectors that provide cableless connection from the base instrument 66 to each of the modules 37. Each control circuit 88, power distributor 90, data bus 92, and control circuit 94 is connected to a respective one of the edge connectors and to the microcontroller 82.

Each heater power and source control circuit 88 is a power regulator for regulating the amount of power supplied to the heating element(s) of a respective one of the modules 37. The source control circuit 88 is preferably a DC/DC converter that receives a +12V input from the power supply 86 and outputs a variable voltage between 0 and −24V. The voltage is varied in accordance with signals received from the microcontroller 82.

Each power distributor 90 provides −5v, +5V, +12V, and GND to a respective module 37. The power distributor thus supplies power for the electronic components of the module. Each data bus 92 provides parallel and serial connections between the microcontroller 82 and the digital devices of a respective one of the modules 37. Each module selection controller 94 allows the microcontroller 82 to address an individual module 37 in order to read or write control or status information.

Figure 8:
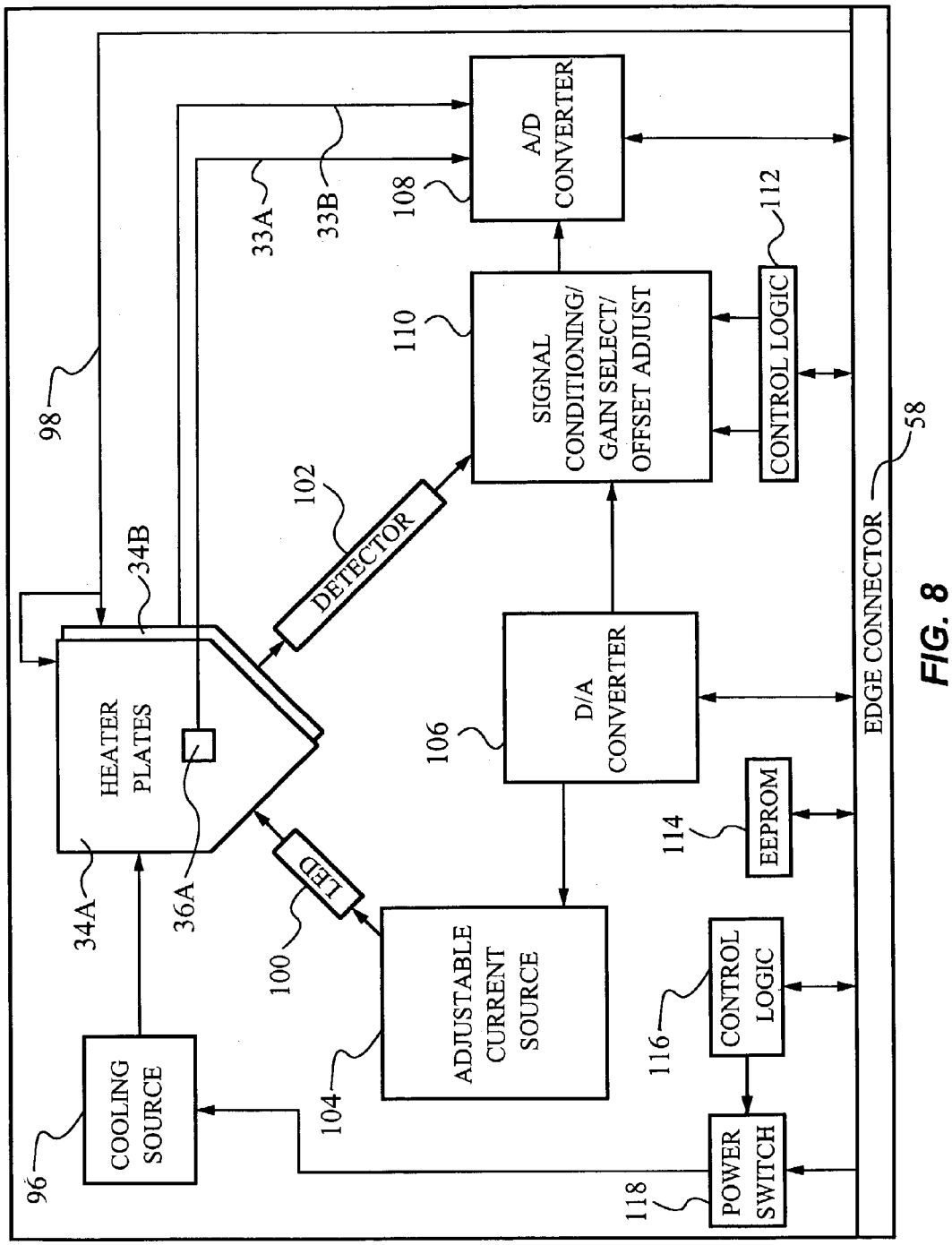
FIG. 8 is a schematic, block diagram of the heat-exchanging module of FIG. 4.

FIG. 8 is a schematic, block diagram of the electronic components of a heat-exchanging modules 37. Each module includes an edge connector 58 for cableless connection to a corresponding edge connector of the base instrument. The module also includes heater plates 34A, 34B each having a resistive heating element as described above. The plates 34A, 34B are wired in parallel to receive power input 98 from the base instrument. The plates 34A, 34B also include thermistors 36A, 36B that output analog temperature signals to an analog-to-digital converter 108. The converter 108 converts the analog signals to digital signals and routes them to the microcontroller in the base instrument through the edge connector 58.

The heat-exchanging module also includes a cooling source 96, such as a fan, for cooling the plates 34A, 34B and the corresponding reaction mixture in a vessel inserted between the plates. The cooling source 96 receives power from the base instrument and is activated by switching a power switch 118. The power switch 118 is in turn controlled by a control logic block 116 that receives control signals from the microcontroller in the base instrument.

The module further includes at least one LED 100 for excitation of a fluorescent dye in the reaction mixture and at least one detector 102, preferably a photodiode, for detecting fluorescent emission from the reaction mixture. An adjustable current source 104 varies the brightness of the LED 100. A digital-to-analog converter 106 is connected between the adjustable current source 104 and the microcontroller of the base instrument to permit the microcontroller to adjust the current source digitally.

The module additionally includes a signal conditioning/gain select/offset adjust block 110 comprised of amplifiers, switches, filters, and a digital-to-analog converter. The block 110 adjusts the signals from the detector 102 to increase gain, offset, and reduce noise. The block 110 outputs the adjusted signals to the microcontroller of the base instrument through the analog-to-digital converter 108 and the edge connector 58. The module also includes a memory 114, preferably a serial EEPROM, for storing data specific to the module, such as calibration constants for the thermal plates and thermistors. The memory 114 may also store values indicating the length and intensity of power pulses to be supplied to the heating elements on the plates. These power pulse values are described in detail below.

Figure 9:
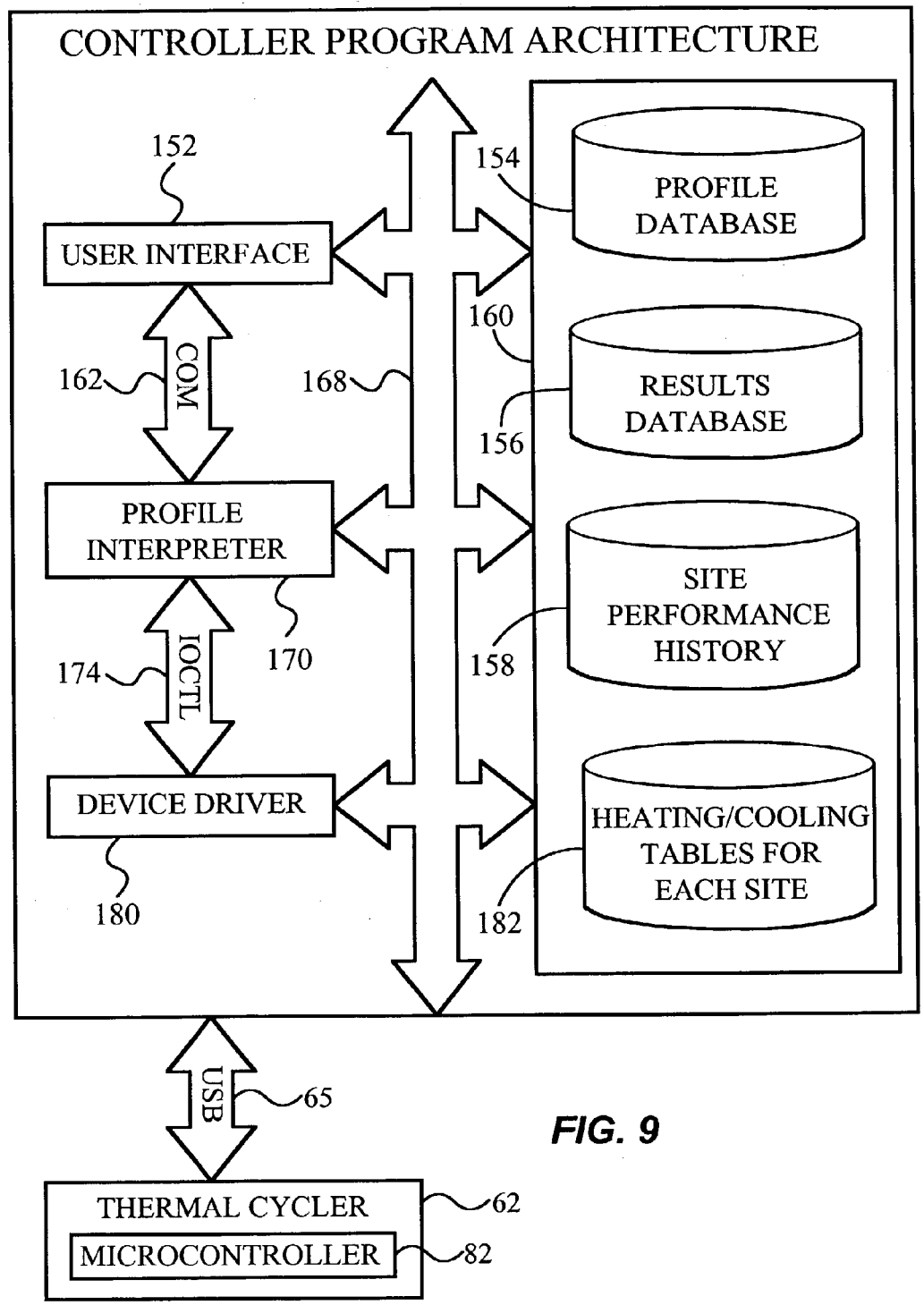
FIG. 9 is a schematic, block diagram illustrating the computer controller architecture for the control, diagnostics, programming, and operational functions of the system of FIG. 5.
Figure 10:
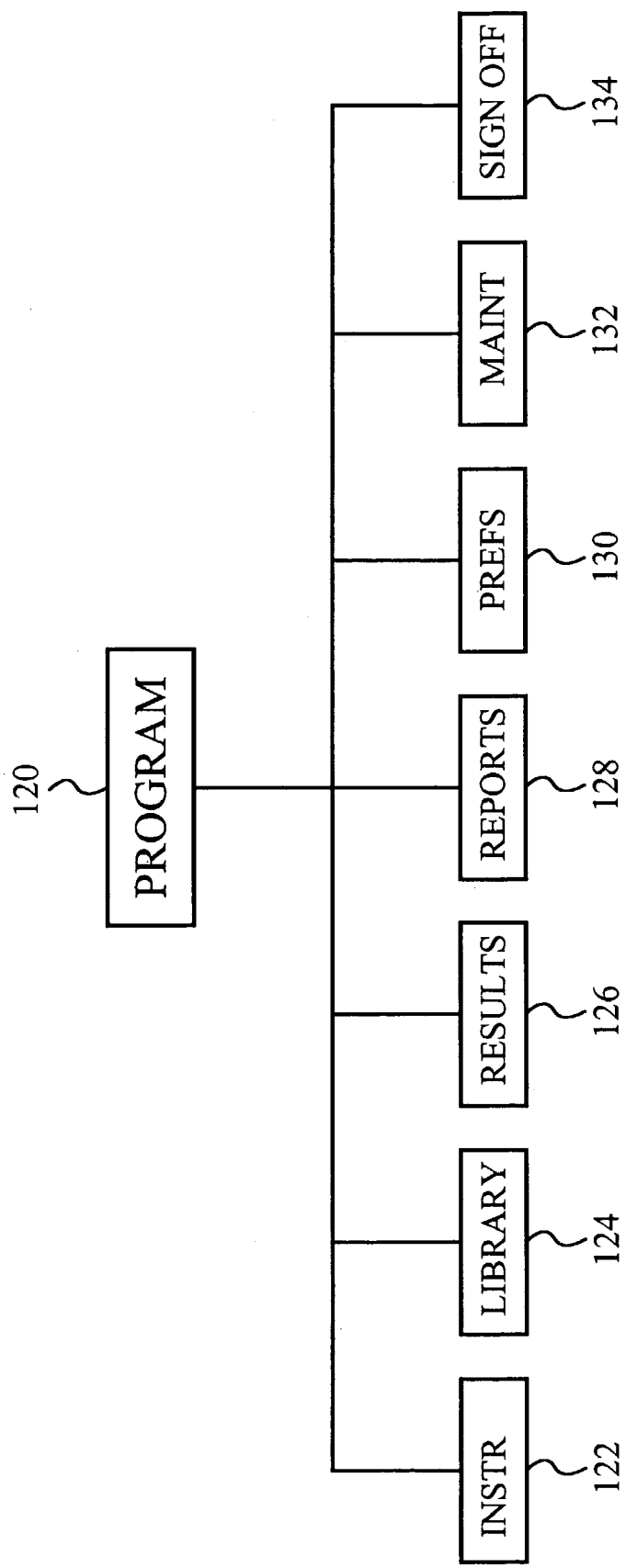
FIG. 10 is a block diagram showing the architecture of FIG. 9 that is preferably reproduced on a graphical user interface for selection of a function by a user.

FIG. 9 shows the controller architecture, typically resident as software, firmware, or a combination thereof, in a user interface computer and/or the microcontroller 82 of the thermal cycler 62. It should be understood that selected ones of these functions can be located, as needed, in the microcontroller 82, for example in the case of a hand-held field unit, or in a separate computer that communicates with the microcontroller. The distribution of the control functions can be selected by one skilled in the art to be resident in various hardware or software elements to suit the intended use most efficiently. Thus, the control function distribution in a large laboratory or clinical configuration may be quite different than in the hand-held field unit, or intermediate sized mobile unit. In addition, the functions can be selected for the particular purpose, ranging for example from qualitative identification, to single or limited number of site programs, to full quantitative evaluation of a wide range of reactions via an extended library of programs.

Continuing with FIG. 9, the controller program architecture is software that includes user interface functionality 152 including graphic displays on a monitor (shown in FIGS. 10–13, below), an input keyboard, mouse, and the like. Temperature profiles are stored in a profile database 154 in a memory 160. The results of individual runs for individual chamber sites are also stored in a results database 156. In addition, the memory 160 includes a database 182 of heating/cooling adjustment tables for adaptive control of each heat-exchanging module, as is described in detail below.

The user input device (such as a mouse or keyboard) permits user communication with a profile interpreter 170 via a com port 162. Upon user selection, a profile from the profile database 154 is called via bus 168 and output to the profile interpreter 170. That is, the thermal cycle profile to be run on a selected one of the heat-exchanging modules is selected from the user interface 152 and input to the profile interpreter 170. Additionally, temperature signals obtained from the thermal cycler 62 via a device driver 180 are output from the profile interpreter 170 and input to the user interface 152.

The profile interpreter 170 converts a selected thermal profile into signals representing a set of heater power pulses, as to initiation and end (on/off), power level and duration, and fan on/off signals in order to accomplish the thermal profiles selected for each particular heat-exchanging module. An input/output control port 174 outputs a target temperature that becomes an input for the device driver 180. Likewise, the device driver 180 outputs the current temperature sensed by the temperature sensor of each heat-exchanging module as data that becomes the input to the profile interpreter 170.

The device driver 180 adjusts the specific output power level, initiation, and termination times for the heater power and fan start/stop in accordance with pulse intensity values, pulse length values, and cooling length values stored in the heating/cooling database 182 for each of the modules. The device driver 180 provides the appropriate digital signal to the microcontroller 82 in the thermal cycler 62 through the serial bus 65. The microcontroller 82 then runs the temperature profile cycle.

FIGS. 10–13 illustrate a series of graphical displays that are preferably displayed to the user on the user interface. As one skilled in the art will appreciate, the conventional "splash" screen will appear when the system initializes, followed by a sign-on screen allowing for user identification and any password protection authorization inputs. This is followed by the Program Menu screen 120 of FIG. 10. By selecting the Instructions menu button 122 on the left, additional screens are accessed at any time. As each screen is displayed, it presents options for system operation in text boxes and buttons, along with the text or icon information directing the user how to select each of the options. The creation of these types of screens, including select buttons, check boxes text and graph displays, can be performed by a computer programmer having ordinary skill in the art. In addition, pop-up "tool tip" help messages are preferably employed to assist the user in learning how to select each of the options. These pop-up tips are also well understood in the art.

The Library button 124 accesses thermal profile programs and stored results of past thermal cycle runs that are stored in memory. The result button 126 accesses a menu for viewing past results. The reports button 128 permits printing records of actual time course temperature traces from past thermal cycle runs. The preferences button 130 allows the user to set frequently used inputs runs, while the maintenance button 132 allow the user to adjust data structure including power pulse values stored in the tables of database 182 (FIG. 9). The Sign-Off button 134 closes the program.

Figure 11:
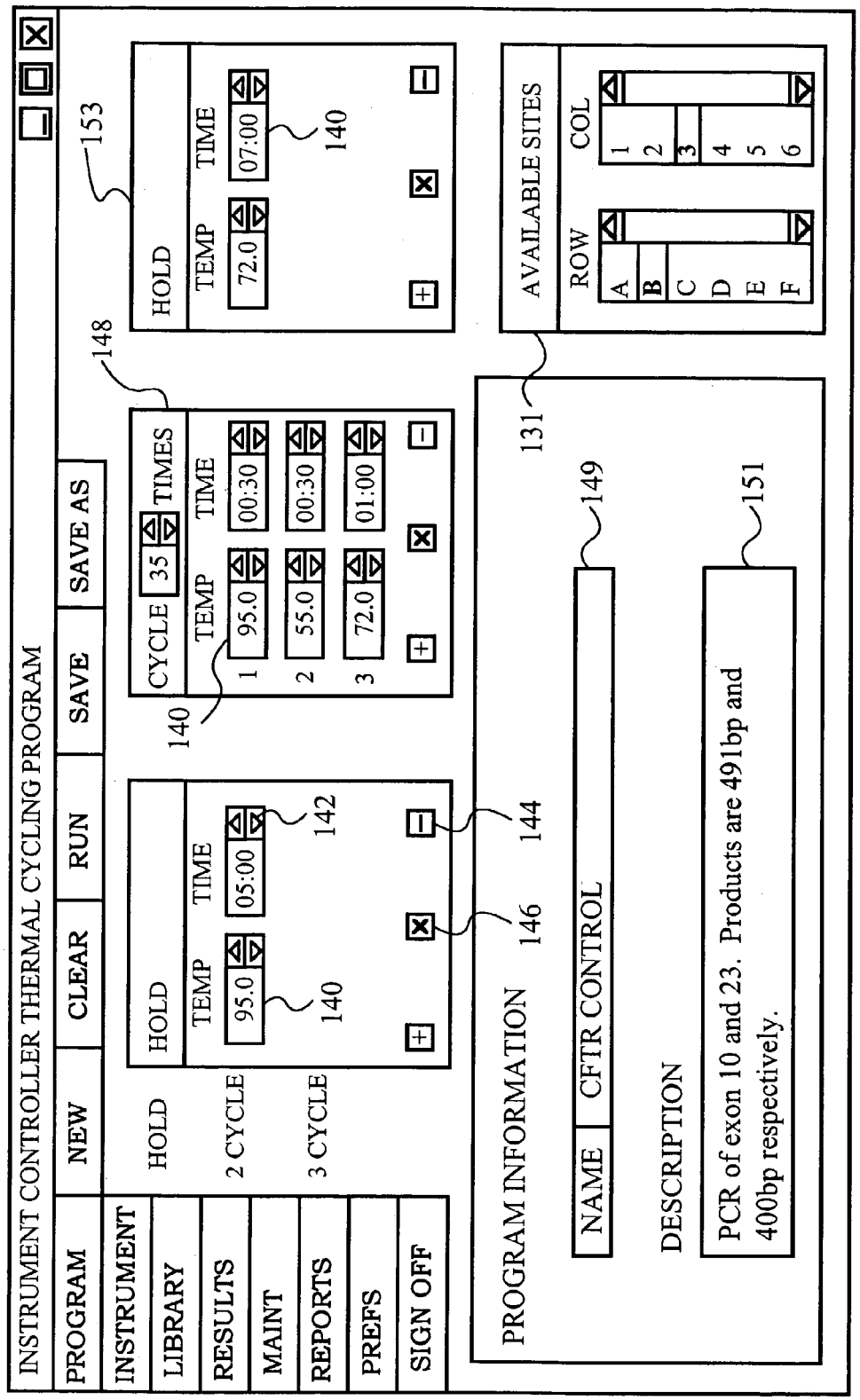

FIG. 11 illustrates a sample Program Menu screen through which site programs or thermal profiles (a series of one or more heating and cooling steps) are created. New profiles are created by selecting the NEW button. The template shown permits the user to create a specific user-defined program that is stored in memory. All of the data shown on the screen can be removed by selecting the CLEAR button to start from scratch. The numbers appearing in the small windows 140 disappear, and the user can then enter appropriate values by toggling the up or down arrows 142 under the columns "Temp" and "Time". The plus and minus keys 144 are used to add or delete steps. Selecting the lower case "x" key 146 deletes the entire field. The program interprets a single step as a "hold". Multiple steps are interpreted as a cycle, and as noted in the center column 148, the number of cycles may be entered by the user. The program name 149 is in the center left window and a brief description 151 of the program to be run is in the lower left window. The program then can be saved under either "Save" with a previously known name or under "Save As" to save the program under the name entered in the window 149. This new program is then automatically stored in the thermal profile library, e.g., the profile database 154 of FIG. 9. By pressing the "Run" button, the available reaction sites (heat-exchanging modules) are displayed in column 131 by specific address. One or more sites can be selected and the program run by again hitting the "Run" button.

Figure 12:
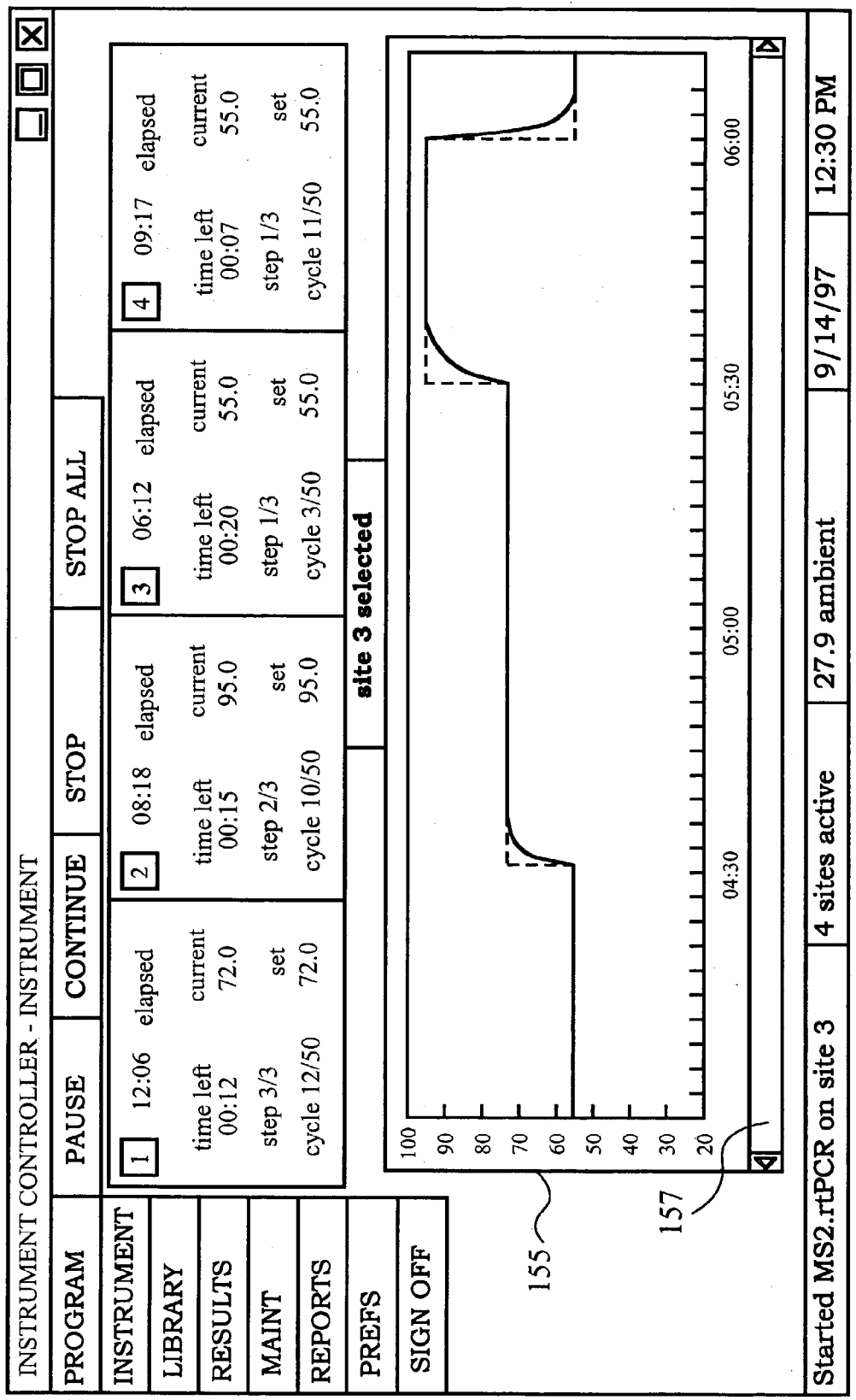

FIG. 12 illustrates a sample Instrument Menu Screen that displays current thermal cycling status. Each of the four windows labeled 1, 2, 3, 4 identifies one of the four reaction sites (modules) in a four-module instrument. Note that site number 3 has been selected, and it shows the total time to run at the setpoint temperature of 55° C. It also shows both the profile setting and the current temperature, as well as the time left in that particular step. The screen also shows that it is in step one of three steps and cycle 3 of 50 cycles, with 20 seconds left in that cycle. The screen also displays a real-time trace, the curved line in the display 155 across the bottom half of the screen, of the progress of the reaction. The individual sites can be polled by simply selecting the specific sites 1, 2, 3, 4 . . . N by number.

Additional commands include "Pause", "Continue" and "Stop" to effect the particular reaction site selected. The "Stop All" command stops all heat-exchanging modules currently in operation. A warning prompt appears when "Stop" or "Stop All" is selected to ensure that it was not selected inadvertently. Once the reaction is completed, the real-time display 155 of any particular cycle can be selected in this particular site by moving the scroll bar button 157 along the bottom of the graph.

Figure 13:
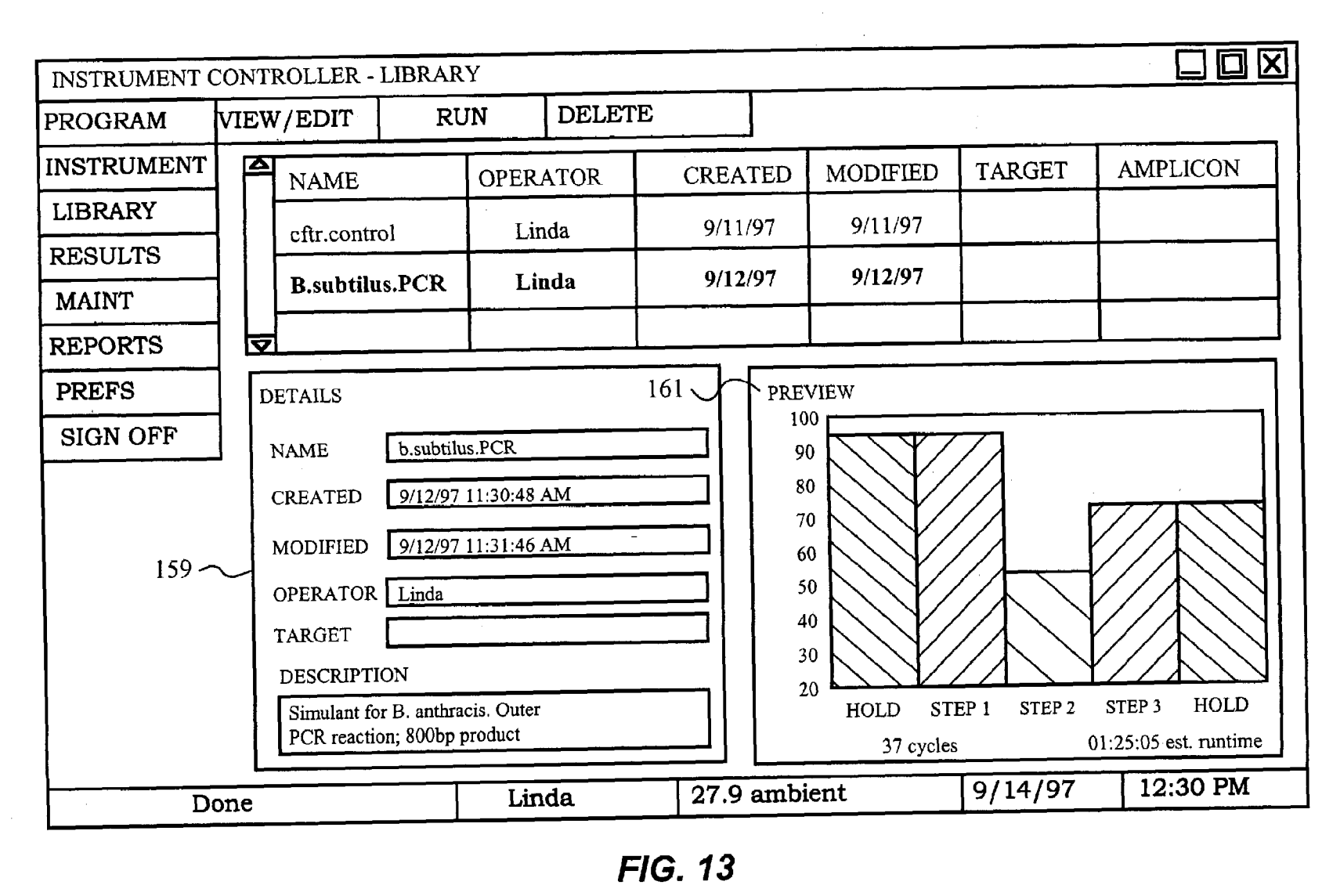

FIG. 13 illustrates a sample Library Menu Screen. As described above with reference to FIG. 9, previously saved programs are stored in the profile database 154. Results from previous runs are stored in the results database 156. Turning to FIG. 13, programs may be selected by scrolling down the program "Name" list in the upper half of the screen, and then assigned a specific reaction site (one of the heat-exchanging modules) by pressing "Run". Detailed information regarding individual programs is displayed on the lower left quarter 159 of the screen, and previously run programs can be recalled and viewed by selecting the "View/Edit" button. The "Delete" button is used to remove programs from the library after a warning pop-up notice. The Preview display 161 in the lower right of the screen shows a bar graph of the thermal profile selected.

The user interface program also preferably includes a Results Menu Screen in which the results of a particular run are displayed by program name, date, operator, and site. The results can be either real-time results from the operations of the program, or the results can be called up from memory (results database 156 in FIG. 9). The information displayed preferably includes a temperature trace of the entire run of cycles for a selected thermal program. The information displayed also preferably includes the time the program started and finished, the particular heat-exchanging module (reaction site) used, and the final program status (e.g., completed, failed, or stopped by user).

Figure 14:
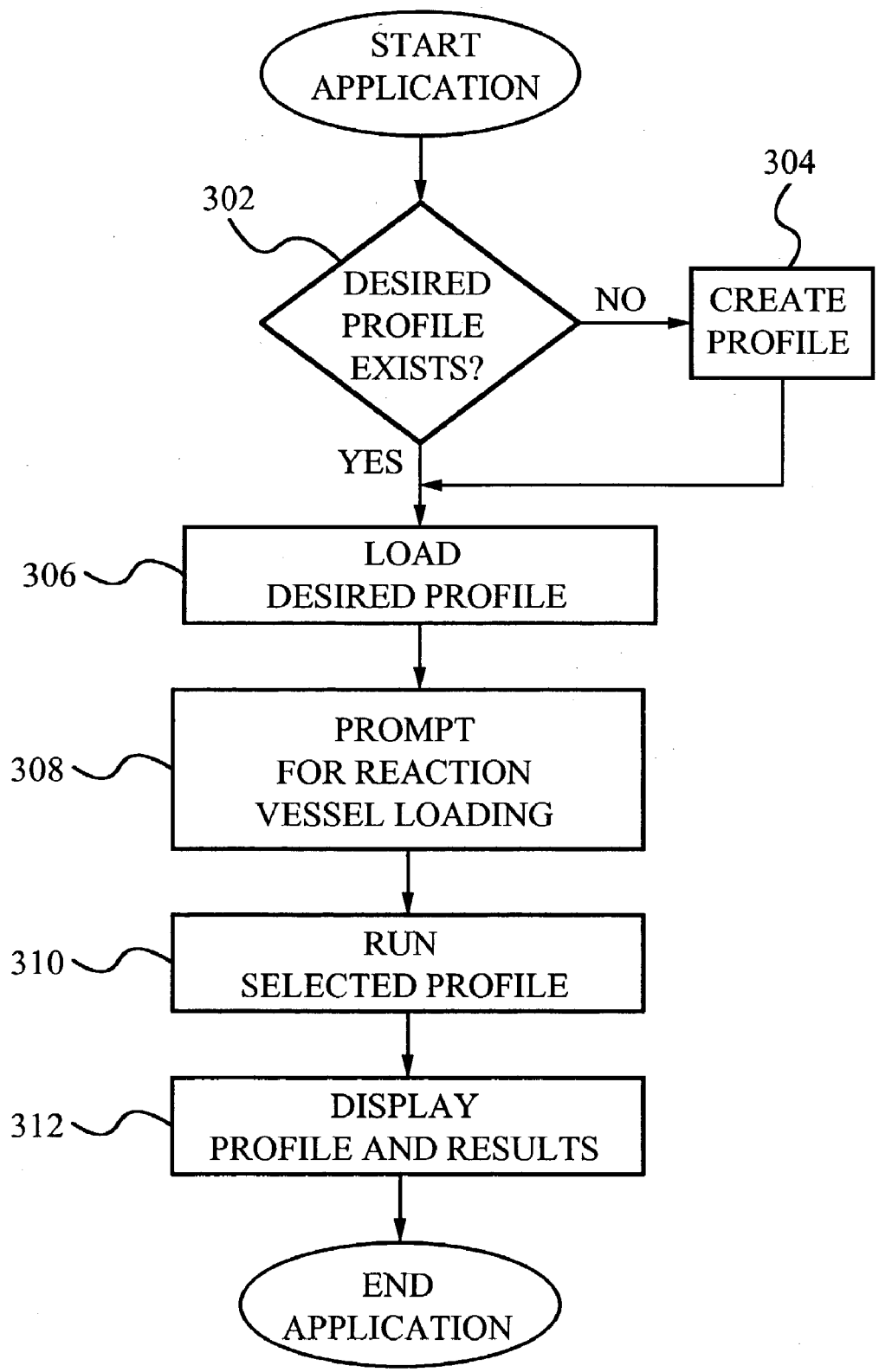
FIG. 14 is a flow diagram showing the overall control and operation of the system of FIG. 5.

FIG. 14 is a flow-diagram schematically illustrating the steps in the overall software control application of the multi-site reactor system. The application is loaded and executed beginning at step 302 by determining whether a temperature profile desired by the user exists. If the profile exists, the application proceeds to step 306. If the desired profile does not exist, it is created in step 304.

The profile is preferably created through the instrument controller screen shown in FIG. 11. The user/operator initializes the profile variables, e.g., entering the number of the cycles and the setpoint temperatures for each of the temperature steps of a given profile via keyboard and/or selection from the buttons and check boxes on the program graphics display. For example, as shown in FIG. 11, the user may select for the particular application to begin with a 5 minute induction hold at 95° C., then run 35 cycles (repeats) at 95° C. for 30 seconds, cool to 55° C. for 30 seconds, then raise the temperature to 72° C. for 60 seconds. A final hold at 72° C. for 7 minutes may be selected before signaling the run is complete. This temperature profile is then saved in the profile database 154.

In step 306, the desired temperature profile is loaded from the profile database 154 in response to the user requesting that the profile be run at a selected site (a selected one of the heat-exchanging modules). In step 306, the application prompts the user through the user interface to load a reaction vessel containing a reaction mixture into the selected module. In step 310, the application then runs the selected temperature profile on the reaction mixture in the selected module. Step 310 will be described in detail below with reference to FIG. 15. Briefly, the selected temperature profile is compiled by the profile interpreter 70 into an intermediate form that is used by the device driver 80 to provide signals to the microcontroller 82 of the thermal cycler instrument 62 (see FIG. 9).

The running of the selected temperature profile generally includes iterative loops of polling, pinging, or sampling temperature sensor data and associating the data with the predetermined setpoint temperatures as clock time progresses. At the same time, the control software application displays both the selected profile and the current temperature of the thermal plates in the selected heat-exchanging module in real-time on screen as the thermal cycles are run. A cycle counter i is originally initialized to $i_o$=o, and it iterates in each cycle to the number of cycles chosen. After the chosen number of cycles are completed, the program signals that the particular run is "Done", the timer counter having reached the total time for cycles. In step 312, the completed profile and the results of the run, e.g., the detection of reaction products, are displayed on the user interface and saved in the results database 156.

Figure 15:
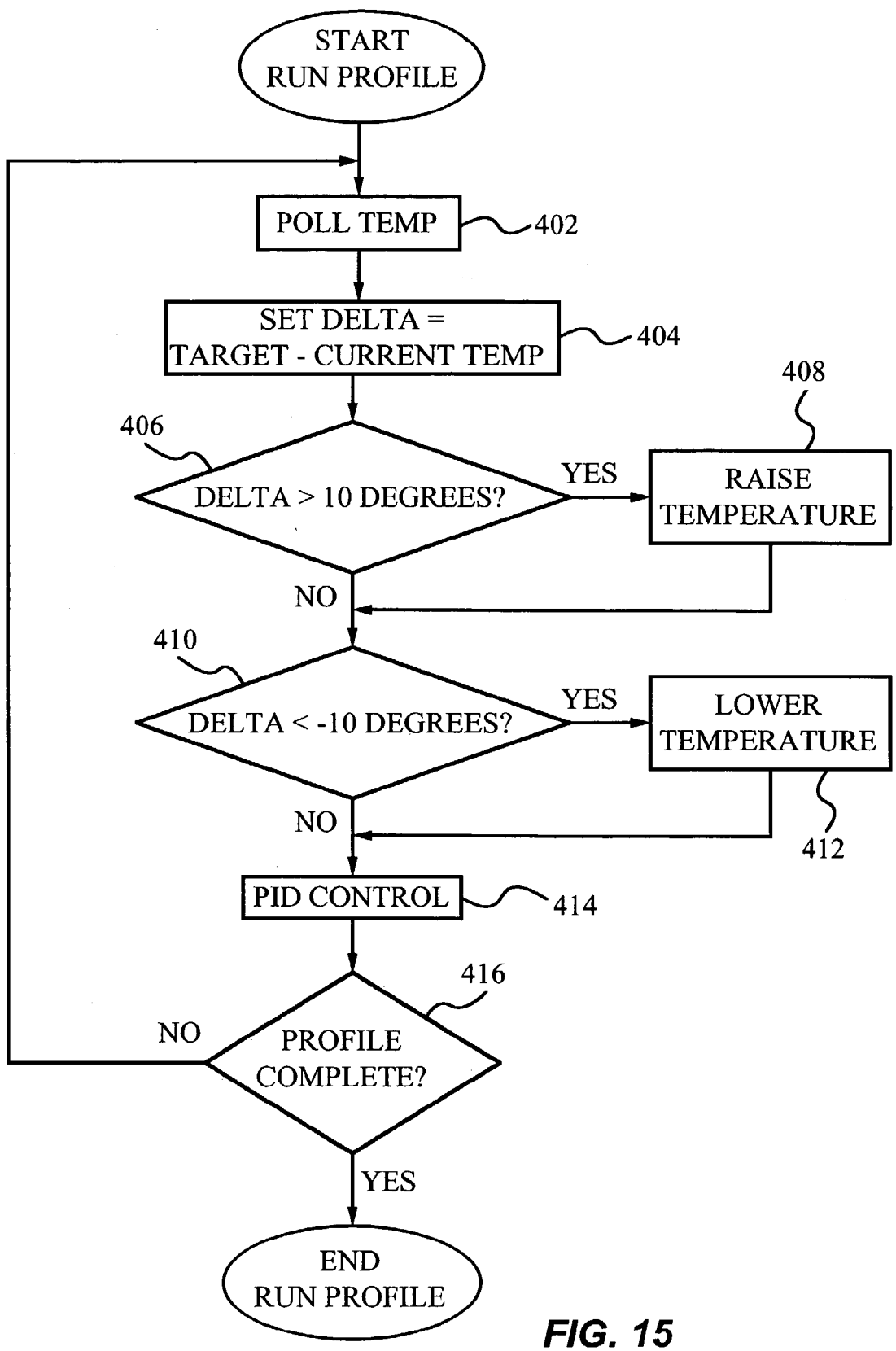
FIG. 15 is a flow diagram showing the steps for running a selected temperature profile on the system of FIG. 5.

FIG. 15 illustrates the steps executed in the running of the selected temperature profile (step 310 in FIG. 14) for a reaction mixture in a selected heat-exchanging module. In step 402, the temperature of the thermal plates in the module is polled.

Polling of the plate temperature preferably occurs every 100 milliseconds throughout the running of the temperature profile. As shown in FIG. 3, the temperature sensors, such as thermistors 36A, 36B output analog signals indicating the temperature of the plates. The analog signals are converted to digital signals and received by the control application. The control application averages the temperatures of the two plates to determine a plate temperature.

In step 404, the application determines the difference (delta) between the profile target temperature, i.e. the setpoint temperature defined by the user for the particular time in the profile, and the plate temperature. In decision step 406, the application determines if the difference is greater than a threshold value, e.g., 10° C. If the difference is greater than the threshold value, the application proceeds to step 408, raising the temperature of the plates. The steps included in raising the temperature are described in detail below with reference to FIG. 16.

If the difference is not greater than the threshold value, the application determines in step 410 if the plate temperature is more than a predetermined amount, e.g., 10° C., higher than the current setpoint temperature. If it is, the application proceeds to step 412, lowering the temperature of the plates. The steps included in lowering the temperature of the plates are described in detail below with reference to FIG. 17. Following step 412, the application proceeds to step 414.

In step 414, the application implements standard proportional-integral-derivative (PID) control for maintaining the thermal plates at the current setpoint temperature. Proportioning may be accomplished either by varying the ratio of "on" time to "off" time, or, preferably with proportional analog outputs as known in the art which decrease the average power being supplied either to the heater or the fan as the actual temperature of the plates approaches the setpoint temperature. PID control combines the proportional mode with an automatic reset function (integrating the deviation signal with respect to time) and rate action (summing the integral and deviation signal to shift the proportional band). The 1990/91 Temperature Handbook by Omega Engineering, Inc. (Stamford, Conn.) contains explanations of the various control modes in the "Introduction to Temperature Controllers" on pages P-5 to P-10. Standard PID control is well known in the art and need not be described further herein.

In step 416, the application determines if the profile is complete, e.g., if all of the thermal cycles have been completed. If yes, the profile run ends. If not, then the application returns to step 402, polling the actual temperature of the plates, and the loop re-executes until the profile is complete.

Figure 16:
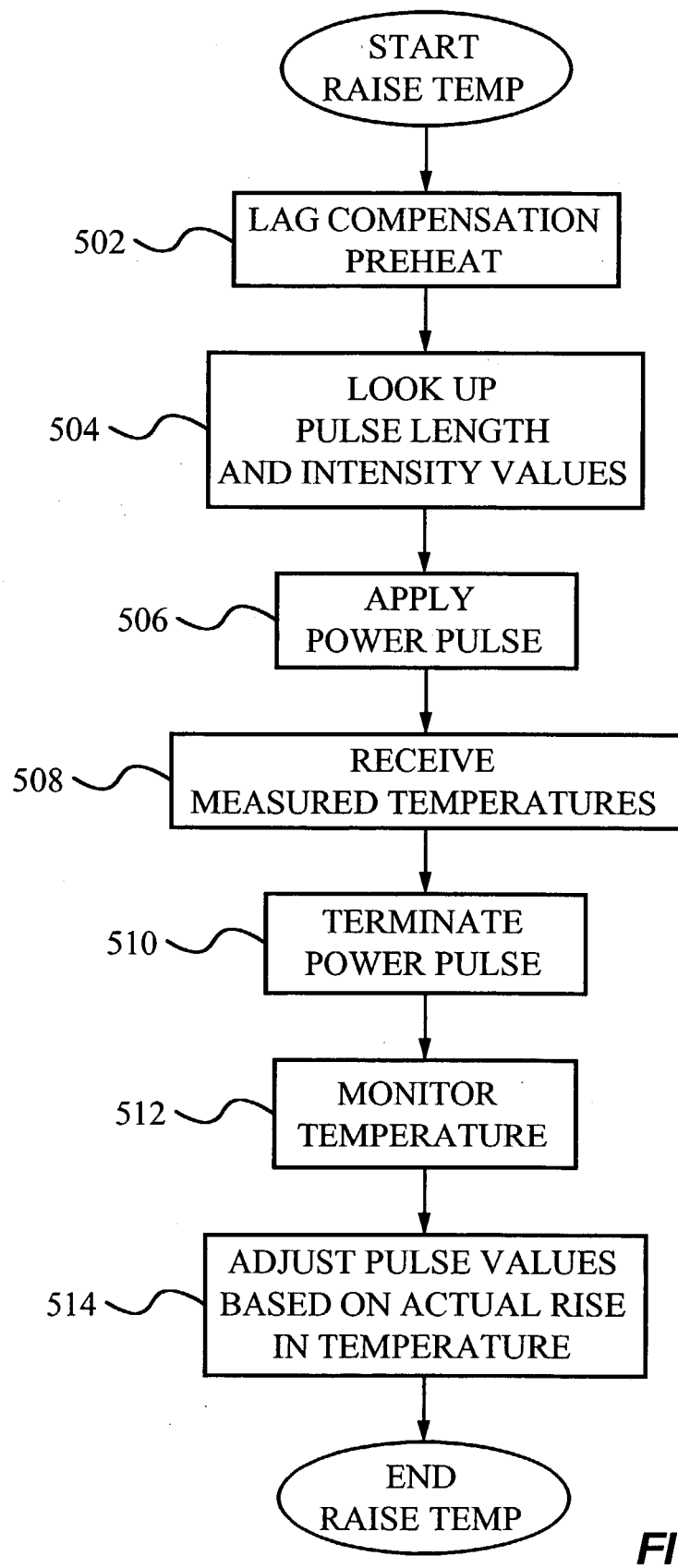
FIG. 16 is a flow diagram showing the steps for raising the temperature of a reaction mixture including adaptive control of power pulses according to the first embodiment of the invention.

FIG. 16 shows the steps included in the raise-temperature routine (step 408 in FIG. 15). In an optional step 502, the heaters on the thermal plates are pre-started to help compensate for the temperature lag between the heaters and the reaction mixture contained in the vessel inserted between the thermal plates. The lag occurs due to the need for heat to transfer through the plate mass and then across the vessel walls into the reaction mixture. In step 504, the appropriate pulse length values and pulse intensity values for the selected heat-exchanging module to reach the desired setpoint are retrieved from the look-up table for the module in the database 182. The pulse intensity value indicates an intensity (e.g., a wattage or power level) to be applied to the heaters to reach the desired setpoint temperature, and the pulse length value indicates the appropriate duration of the power pulse, e.g., a number of seconds.

In step 506, the power pulse is applied to the heaters at the intensity indicated by the pulse intensity value. As the power pulse is applied, the controller receives temperature signals from the thermistors indicating the actual measured temperatures of the thermal plates, step 508. In step 510, the controller terminates the application of the power pulse either when the duration of time indicated by the pulse length value has elapsed or when the temperature of the thermal plates reaches a threshold value. The threshold value may be set equal to the desired setpoint temperature, or more preferably, 1 to 3° C. below the setpoint temperature to control overshoot.

After the power pulse is applied and shut off, the temperature of the plates is monitored in step 512 and the temperature rise is traced. When the temperature of the plates stops rising, the actual highest plate temperature reached is compared to the desired setpoint temperature to determine if there was an undershoot or overshoot of the setpoint temperature. When there is a substantial variation, say for example an undershoot or overshoot in excess of 0.1 to 0.5° C., then either the pulse length value or the pulse intensity value stored for the particular heat-exchanging module to reach the particular setpoint temperature is adjusted in step 514.

The pulse length and pulse intensity values are preferably adjusted by reducing one or both values a predetermined percentage, e.g. 1 to 5% in the case of an overshoot, or by increasing one or both values by a predetermined percentage, e.g., 1 to 5% in the case of an undershoot. Alternatively, the pulse intensity value may be held fixed at full power while only the pulse length value is adjusted. This ensures that higher setpoint temperatures are reached as quickly as possible. The new pulse length and pulse intensity values are preferably overwritten into the heating/cooling database 182 (FIG. 9). Alternatively, the values may be stored and adjusted in the memory 114 of the heat-exchanging module (FIG. 8). In another embodiment, the adjusted values are saved into the results database 156 with a "drift" history of prior values being kept for diagnostic analysis.

Figure 17:
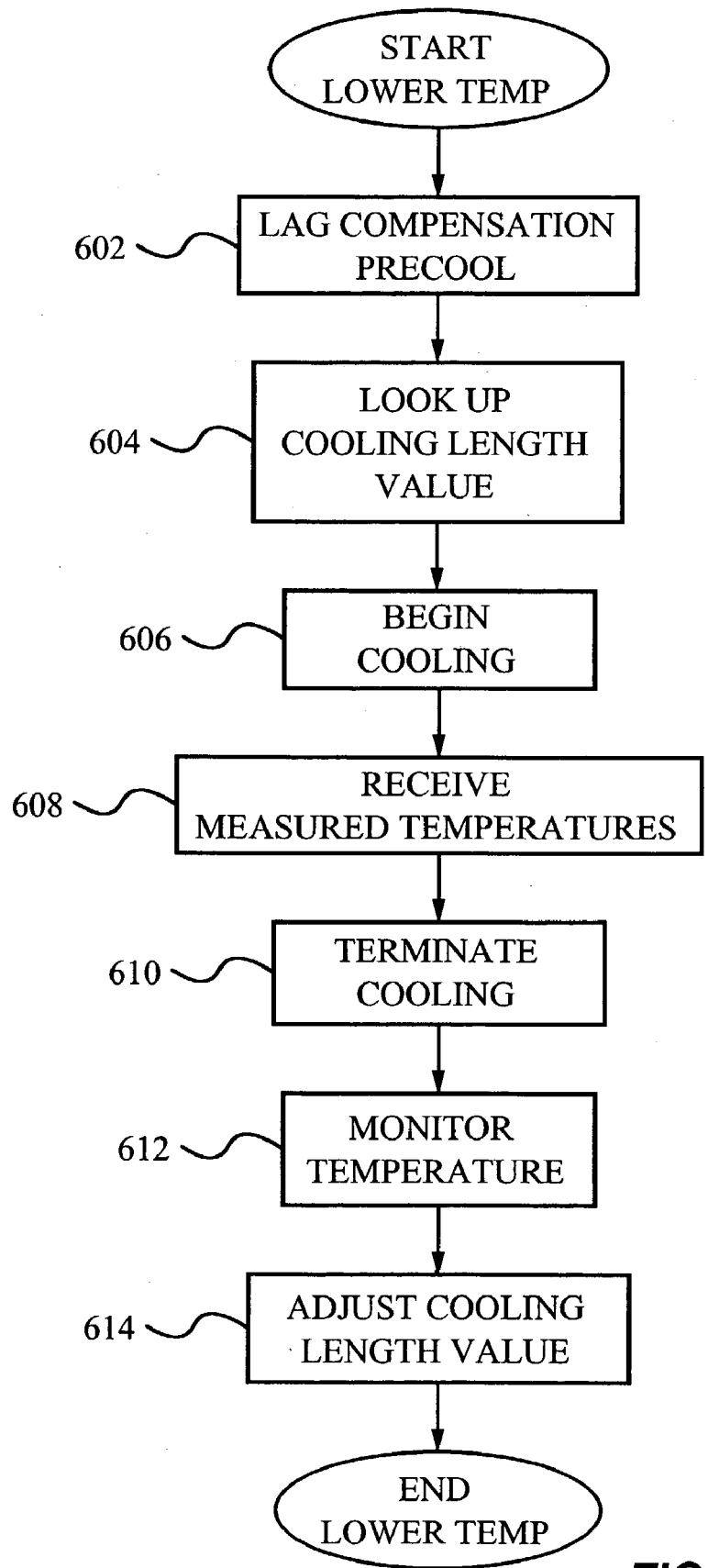
FIG. 17 is a flow diagram showing the steps for lowering the temperature of a reaction mixture including adaptive control of cooling time according to the first embodiment of the invention.

FIG. 17 shows the steps included in the lower-temperature routine (step 412 in FIG. 15). In an optional step 602, the fan in the selected heat-exchanging module is pre-started (spun-up to full speed) prior to the end of a preceding temperature profile step having a setpoint temperature higher than the new setpoint temperature. The preactivation (spin-up) of the fan helps compensate for the temperature lag discussed above and ensures that the fan is ready to provide full cooling at the exact moment when the temperature profile requires movement to a lower setpoint temperature.

In step 604, the appropriate cooling length value for the selected heat-exchanging module to reach the desired setpoint is retrieved from the look-up table for the module in the database 182. The cooling length value indicates the appropriate duration of time the fan is to be activated. In step 606, the cooling begins. As the fan blows air, the controller receives temperature signals from the thermistors indicating the actual measured temperatures of the thermal plates, step 608. In step 610, the controller terminates the cooling (deactivates the fan) either when the duration of time indicated by the cooling length value has elapsed or when the temperature of the thermal plates reaches a predetermined value, e.g., the desired setpoint temperature.

After the fan is shut off, the temperature of the plates is measured in step 612 and compared to the desired setpoint temperature to determine if there was an undershoot or overshoot of the setpoint temperature. When there is a substantial variation, say for example an undershoot or overshoot in excess of 0.1 to 0.5° C., then cooling length value for the particular heat-exchanging module to reach the particular setpoint temperature is adjusted accordingly in step 614.

The cooling length value is preferably adjusted by reducing it or increasing it as appropriate by a predetermined percentage, e.g. 1 to 5%. The cooling length value is preferably overwritten into the heating/cooling database 182 (FIG. 9). Alternatively, the value may be stored and adjusted in the memory 114 of the heat-exchanging module (FIG. 8). In another embodiment, the adjusted value is saved into the results database 156 with a "drift" history of prior values being kept for diagnostic analysis.

Figure 18A:
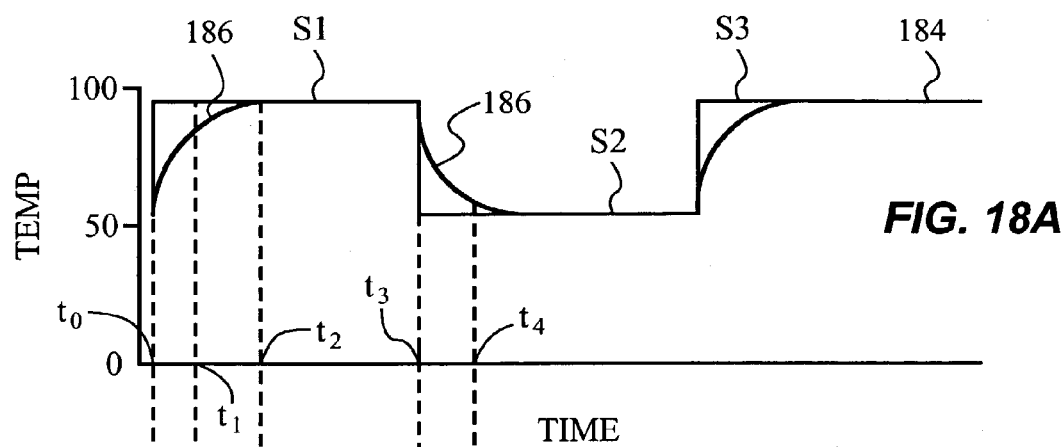
FIGS. 18A and 18B are a pair of related graphs of a thermal cycle schedule and the corresponding application of heater power and fan operation according to a first embodiment of the present invention.
Figure 18B:
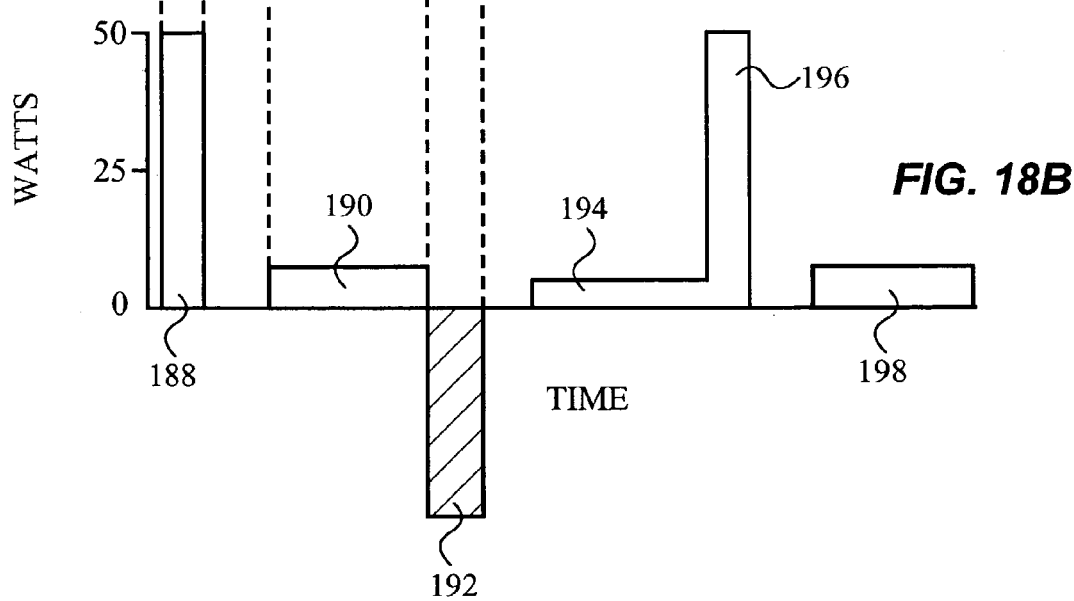

FIG. 18A shows a graph of an exemplary thermal profile to be run on one of the heat-exchanging modules. FIG. 18B shows a graph of the corresponding heating/cooling power pulse schedule necessary to execute the thermal profile shown in FIG. 18A. In this example, the heater power is initially applied at full power, e.g., 50 watts, for a duration of 2 seconds to bring the temperature up from 60° C. to the first setpoint temperature $S_1$ of 95° C. The actual temperature profile as tracked by the thermistor is identified as curve 186. The initial power pulse 188 brings the plate temperature up to the setpoint $S_1$, and this power pulse 188 is cut off at time $t_1$ prior to the actual plate temperature reaching the setpoint temperature $S_1$. The initiation of the power pulse 188 can begin before the time to at which the setpoint temperature $S_1$ is to begin (lag compensation pre-heating).

A second, lower power pulse 190 begins at time $t_2$ and continues until, in this instance, the end of the scheduled setpoint temperature $S_1$ at time $t_3$. Typically due to heat loss to ambient room temperature, which is ordinarily below the setpoints for biochemical reactions, continuous low heater power is needed during plateaus in the profile in order to compensate for radiation and convection losses. At time $t_3$, the cooling fan is turned on until time $t_4$ which is prior to the actual temperature reaching the second, lower, set point temperature $S_2$ of the selected cycle profile. A third heater power pulse 194 maintains the plate temperature at the second setpoint temperature $S_2$. This power pulse can be a very brief full power spike, or as shown, a low wattage sustained application of power. At the end of the power pulse 194, the cycle is repeated, first with a power pulse 196 followed by a power pulse 196, etc.

Figure 19A:
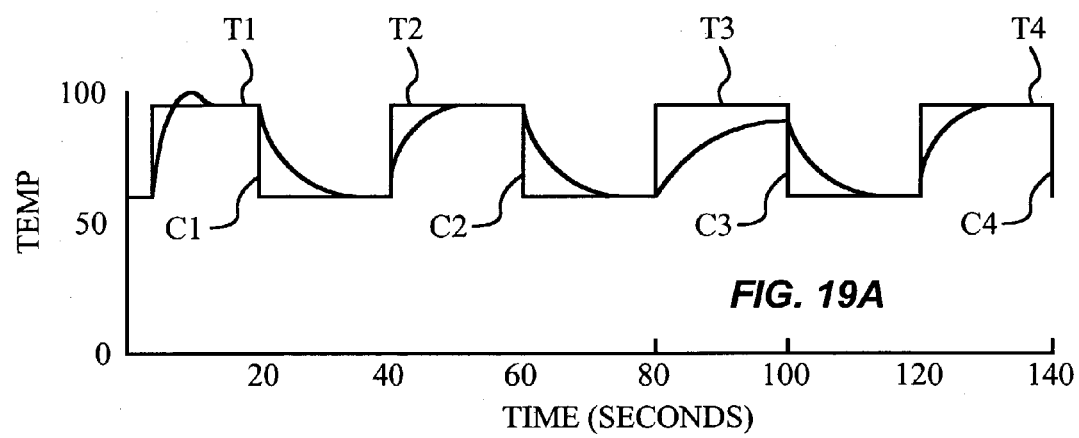
FIGS. 19A and 19B are a pair of graphs illustrating the adaptive control features of the first embodiment whereby, through monitoring temperature in real-time, overshoot and undershoot of the program cycle schedule is automatically compensated for during operation by adjusting heater pulses and fan on/off operation.
Figure 19B:
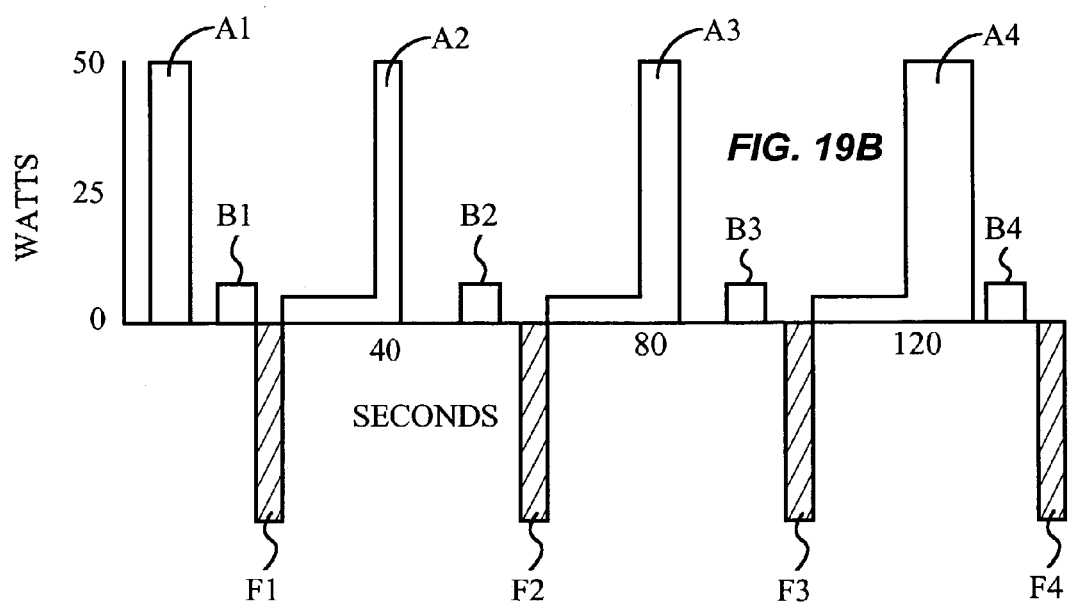

FIGS. 19A and 19B show adaptive control of the above-described system and programs. The scale of both of these figures is compressed on the X-axis of both graphs so that four cycles C-1 through C-4 may be illustrated. In this instance, a first power pulse $A_1$ produced an overshoot of the first setpoint $T_1$. As a result of the self-adjusting and control features described above, the heater pulse power $A_2$ applied at the onset of the second cycle C-2 is shorter in duration to compensate for the overshoot, with the result that the plate temperature reaches the second setpoint temperature $T_2$.

In the third cycle C-3, for purposes of illustration, the actual plate temperature undershoots the third setpoint temperature $T_3$. Accordingly, in the next cycle C-4, the heater power pulse $A_4$ is lengthened in time to bring the temperature to the fourth setpoint temperature $T_4$. Although not shown in FIG. 19B, the fan "ON" durations $F_1$ through $F_4$ can also be adjusted to control undershoots or overshoots of lower setpoint temperatures.

Optical data may also be used as a feedback control. Real-time optical detection is used to indicate the progress of the reaction. For example, when a particular predetermined fluorescent threshold is detected in a reaction mixture in a heat-exchanging module, then the temperature cycling for that module may be stopped (completion of reaction). Furthermore, selected temperature-sensitive dye substituents on one or more of the reaction components are useful to indicate the reaction temperature. Optical detection of dye activation, e.g., color change, is useful to control the cycle parameters, not only thermal schedules, but also the state or condition of reactants and products, and quantitative production. Multiple emission wavelengths can be sampled to determine, for example, progression of the reaction, end points, triggers for reagent addition, denaturation (melting), annealing and the like.

The data obtained in the real-time monitoring method, e.g., optical interrogation of product formation, is preferably fed back to the instrument controller to alter or adjust the optical "read" parameters. Examples of the optical read parameters include: length of read; power input or frequency to the light source(s); which wavelength should be monitored and when; and the like. Fluorescence intensity, and in some cases wavelength and absorption, are temperature sensitive. Therefore, the optical readout can be used for real-time monitoring of the temperature of the reaction mixture during the reaction process. For example, where the optics read the intensity of fluorescence or absorption three or more times during the heat-exchanging operations or sequence, then the controller calculates or matches to a standard curve, and determines temperatures of the reaction mixture.

Optical feedback control may be used in the system of the invention to adaptively change the series of optical readouts during the reaction process on the fly. For example, at the beginning of the reaction process, a first set of selected wavelengths are illuminated and detected. These are changed for later stages in the reaction process. This switching of optical interrogation parameters can be automatically run at any selected time during the reaction where the switching detects actual or incipient deviation from a profile temperature target point (undershoot, overshoot, or drifting from steady state temperature). Optical data may be used to adjust thermal processing parameters (e.g., setpoints, time spent at set points, ramp rates, etc.) Cooling or heating can be initiated earlier or later than scheduled and this temporal schedule change is input into memory. Either on the next cycle, or after the temporal shift is detected in a number of succeeding cycles, the profile is reset as a new baseline schedule and becomes data structure in memory. This is an example of optical detection-driven adaptive control of temperature profile.

Figure 20:
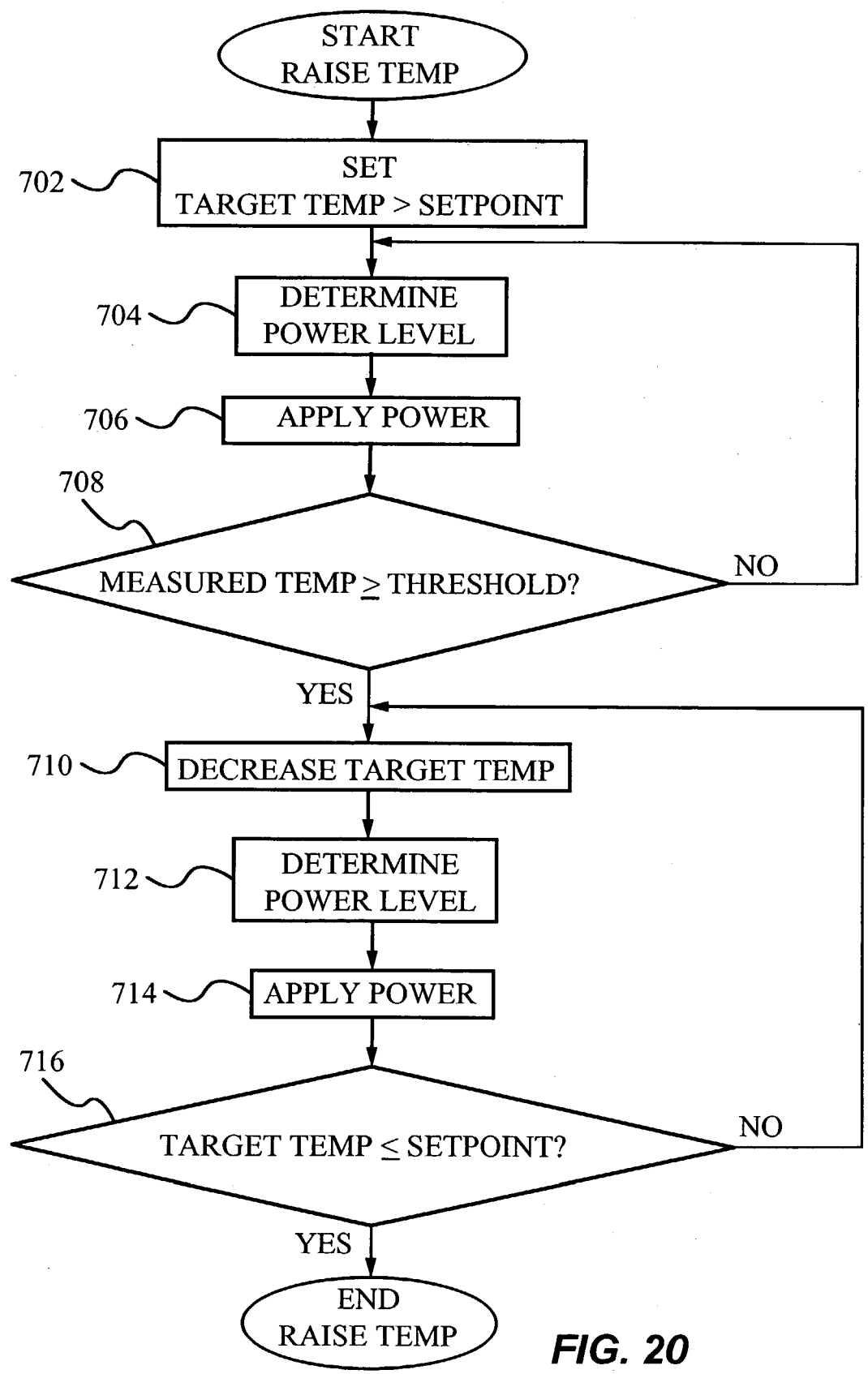
FIG. 20 is a flow diagram showing the steps for raising the temperature of a reaction mixture according to the second embodiment of the invention.
Figure 21:
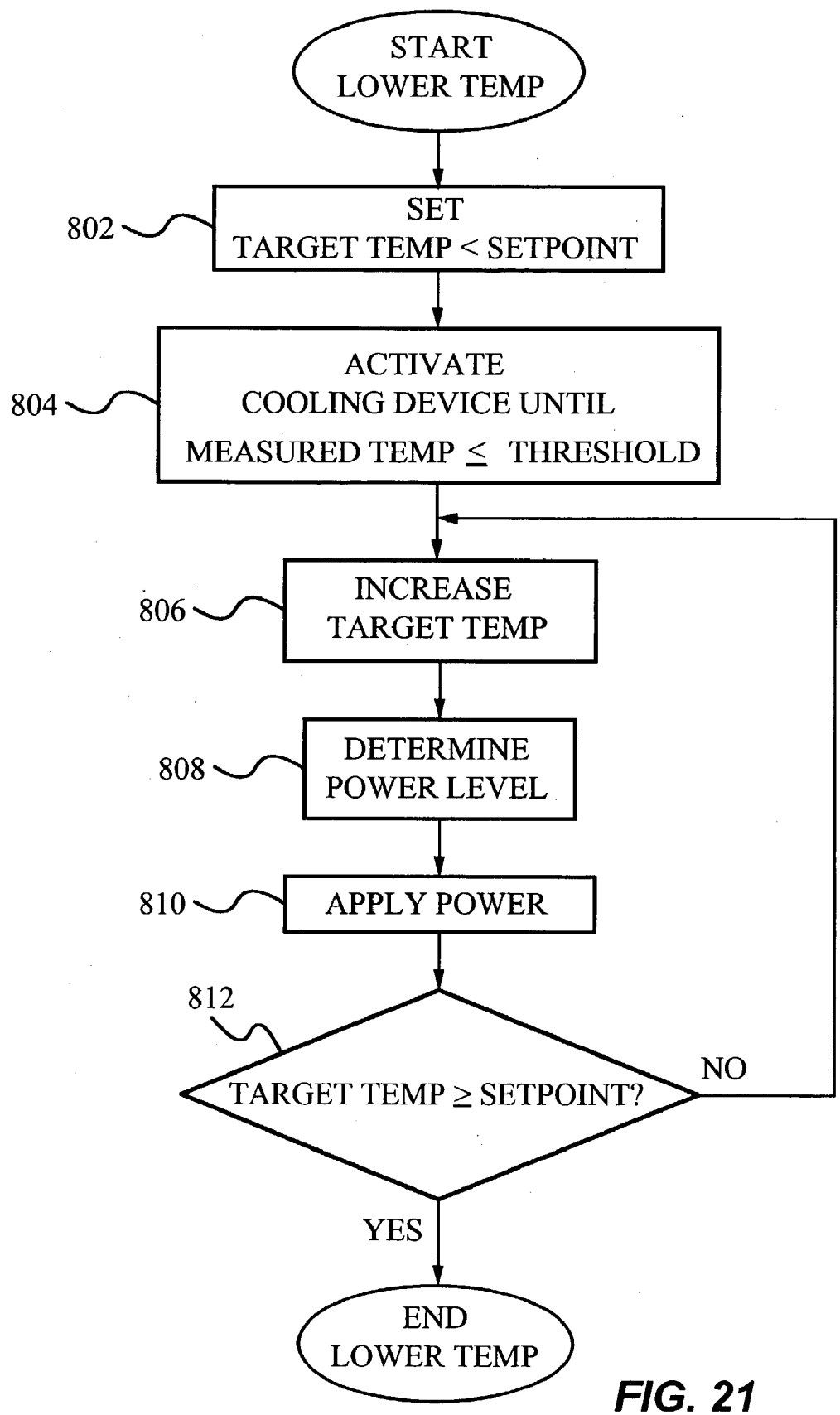
FIG. 21 is a flow diagram showing the steps for lowering the temperature of a reaction mixture according to the second embodiment of the invention.
Figure 22:
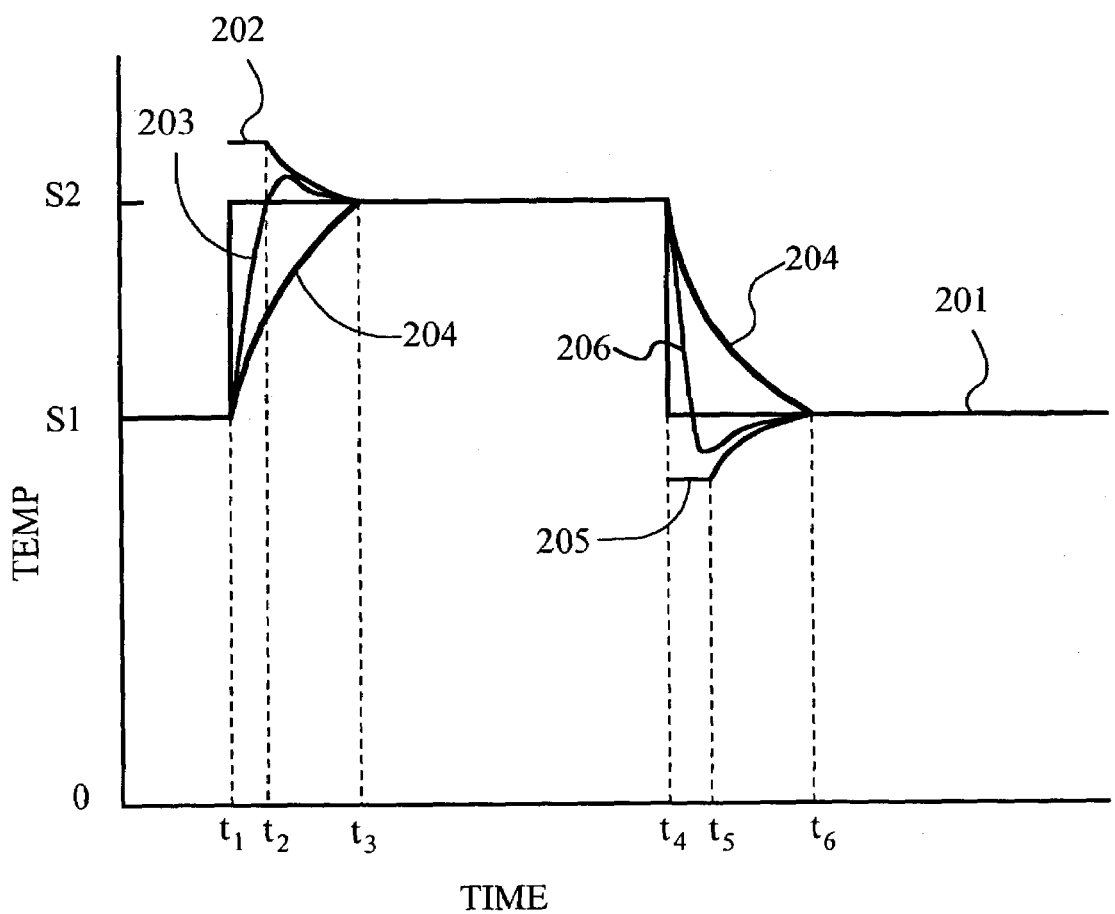
FIG. 22 is a graph illustrating a desired thermal cycle schedule and the corresponding control of temperature changes.

FIGS. 20–22 illustrate a second embodiment of the invention. The second embodiment provides an important improvement to computer-implemented PID control for thermally controlling the reaction mixtures. In the second embodiment, the controller is programmed to compensate for thermal lag between a thermal plate and a reaction mixture contained in a reaction vessel. The thermal lag is caused by the need for heat to transfer from the plate through a wall of the vessel and into the reaction mixture during heating, or by the need for heat to transfer from the reaction mixture through the wall of the vessel to the plate and/or ambient atmosphere during cooling.

In the second embodiment, the overall program instructions performed by the controller to execute a desired thermal profile in a selected heat-exchanging module are the same as those previously described with reference to FIG. 15. The controller polls the temperature of the thermal plates in step 402 to determine in step 406 if the difference between the plate temperature and current setpoint temperature is greater than a threshold value, e.g., 10° C. If it is, the controller executes a raise-temperature routine in step 408. If the plate temperature is a predetermined value above the setpoint temperature, then the controller executes a routine to lower the plate temperature in step 412. Otherwise, the controller maintains a steady-state temperature using standard PID control.

The second embodiment differs from the first embodiment, however, in the steps performed by the controller to raise and lower the temperature of the thermal plates. In the second embodiment, the temperature is raised using an improved PID control program. In standard PID control, the power supplied to a heater is dependent upon the difference (error) between the actual measured temperature of a device and the desired setpoint temperature. The average power being supplied either to the heater or the fan therefore decreases as the actual temperature of the plates approaches the setpoint temperature. Because the power being supplied to the heater or fan decreases prior to reaching the setpoint temperature, the reaction mixture does not reach the setpoint temperature as rapidly as possible. This temperature lag may cause unwanted side reactions, the formation of unwanted bubbles, the degradation of reaction components at certain temperatures, etc.

The second embodiment of the present invention provides an improved PID control program that overcomes this disadvantage of standard PID control. FIG. 20 illustrates the steps performed to raise the temperature of a reaction mixture according to the second embodiment. In step 702, the controller sets a variable target temperature that initially exceeds the desired setpoint temperature. For example, if the setpoint temperature is 95° C., the initial value of the variable target temperature may be set 2 to 10° C. higher.

In step 704, the controller determines a level of power to be supplied to the heating elements to raise the temperature of the plates to the variable target temperature. The controller determines the level of power by inputting the variable target temperature to a standard PID control algorithm. The level of power to be supplied to the heaters is therefore determined in dependence upon the difference (error) between the actual plate temperature and a target temperature that is higher than the desired setpoint temperature. The higher target temperature ensures that a higher level of power is supplied to the heaters to heat the plates, and therefore the reaction mixture, to the setpoint temperature more rapidly. In step 706, the controller sends a control signal to the power and source control circuit in the base instrument to provide power to the heaters at the level determined.

In decision step 708, the controller determines if the actual measured temperature of the plates is greater than or equal to a predetermined threshold value. Suitable threshold values are: the desired setpoint temperature itself; or 1 to 2° C. below the setpoint temperature, e.g., 93 to 94° C. for a setpoint temperature of 95° C. If the actual plate temperature does not exceed the predetermined threshold value, then the controller returns to step 704 and repeats the loop until the plate temperature equals or exceeds the threshold value.

When the actual measured temperature of the plates is greater than or equal to the threshold value, the controller decreases the variable target temperature in step 710. The controller preferably decreases the variable target temperature by exponentially decaying the amount by which the variable target temperature exceeds the setpoint temperature. For example, the amount by which the variable target temperature exceeds the desired setpoint temperature may be exponentially decayed as a function of time according to the equation:

$$\Delta = (\Delta_{max}) * e^{(-t/tau)}$$

where $\Delta$ is equal to the amount by which the variable target temperature exceeds the desired setpoint temperature, $\Delta_{max}$ is equal to the difference between the initial value of the variable target temperature and the desired setpoint temperature, t is equal to the elapsed time in tenths of seconds from the start of decay, and tau is equal to a decay time constant. In the system of the present invention, tau preferably has a value in the range of 1 to 4 seconds. It is presently preferred to determine tau empirically for each heat-exchanging module during testing and calibration and to store the value of tau in the module's memory 114 (FIG. 8).

Although the exponential equation given above is presently preferred, it is to be understood that many other exponential decay formulas may be employed and fall within the scope of the invention. Moreover, the variable target temperature may be decreased by other techniques, e.g., it may be decreased linearly.

In step 712, the controller determines a new level of power to be supplied to the heating elements to raise the temperature of the plates to the decreased target temperature. The controller determines the level of power by inputting the decreased target temperature to the PID control algorithm. In step 714, the controller sends a control signal to the power and source control circuit in the base instrument to provide power to the heaters at the new level determined.

In decision step 716, the controller determines if the variable target temperature is less than or equal to the setpoint temperature. If it is not, the controller returns to step 710, decreasing the target temperature, and the loop continues until the variable target temperature is less than or equal to the setpoint temperature. When the variable target temperature is less than or equal to the setpoint temperature, the raise-temperature routine ends and standard PID control is resumed.

FIG. 21 is a flow diagram illustrating the steps performed by the controller to lower the temperature of a reaction mixture to a desired setpoint temperature. In step 802, the controller sets a variable target temperature that is initially lower than the desired setpoint temperature. For example, if the setpoint temperature is 60° C., the initial value of the variable target temperature may be set 2 to 10° C. lower, i.e., 50 to 58° C.

In step 804, the controller activates the fan until the actual measured temperature of the plates is less than or equal to a threshold value, preferably the variable target temperature. In step 806, the controller deactivates the fan and increases the target temperature, preferably by exponentially decaying the amount by which the variable target temperature differs from the setpoint temperature using the exponential decay equation given above. For cooling, tau is preferably in the range of 1 to 5 seconds with a preferred value of about 3 seconds. As in the heating example given above, tau may be determined empirically for each heat-exchanging module during testing or calibration and stored in the module's memory. Alternatively, the variable target temperature may be linearly increased.

In step 808, the controller determines a level of power to be supplied to the heating elements to raise the temperature of the plates to the increased target temperature. The controller determines the level of power by inputting the increased target temperature to the PID control algorithm. In step 810, the controller sends a control signal to the power and source control circuit in the base instrument to provide power to the heaters at the level determined.

In decision step 812, the controller determines if the variable target temperature is greater than or equal to the setpoint temperature. If it is not, the controller returns to step 806, increasing the target temperature, and the loop continues until the variable target temperature is greater than or equal to the setpoint temperature. When the variable target temperature is greater than or equal to the setpoint temperature, the lower-temperature routine ends and steady-state PID control begins.

FIG. 22 is a graph illustrating one example of thermal control according to the second embodiment of the invention. A desired thermal profile is represented by a curve 201. The thermal profile starts at a first setpoint temperature $S_1$, e.g. 60° C., jumps to a second temperature $S_2$, e.g. 95° C., at time $t_1$, and returns to the first setpoint temperature $S_1$ at time $t_4$.

The curve 202 represents the first variable target temperature for controlling the heating of the thermal plates. The curve 203 represents the actual temperature of the plates as measured by the thermistors, and the curve 204 represents the actual temperature of a reaction mixture heated by the plates. At time $t_1$, the variable target temperature is set to an initial value, e.g. 98° C., that exceeds the second setpoint temperature $S_2$. The plates are rapidly heated towards the variable target temperature until the temperature of the plates hits a threshold temperature. In this example, the threshold temperature is the setpoint temperature $S_2$, which the plates reach at time $t_2$.

When the temperature of the plates hits the threshold temperature at time $t_2$, the controller begins to exponentially decay the amount by which the variable target temperature exceeds the setpoint temperature $S_2$ and continues to decay the target temperature until it equals the setpoint temperature at time $t_3$. Setting the variable target temperature above the setpoint temperature causes the plate temperature, as shown by the curve 203, to temporarily overshoot the setpoint temperature $S_2$ until the temperatures equalize at time $t_3$. This in turn causes the temperature of the reaction mixture, as represented by the curve 204, to heat more rapidly and to conform more closely to the desired temperature profile represented by curve 201. The closer temperature conformity of the reaction mixture has numerous advantages, such as inhibiting unwanted side reactions, inhibiting the formation of air bubbles that prevent optical detection, etc.

Similarly, the temperature of the reaction mixture during cooling can be made to conform more closely to the desired thermal profile by setting a second variable target temperature, as shown by the curve 205, that is initially lower, e.g. 55° C., than the setpoint temperature $S_1$. The thermal plates and reaction mixture are cooled by the fan until the plate temperature, as represented by the curve 206, reaches a predetermined temperature below the setpoint temperature $S_1$ at time $t_5$. The controller then begins to increase the target temperature by exponentially decaying the amount by which the target temperature differs from the setpoint temperature $S_1$ until the temperatures are equal at time $t_6$. The controller then begins standard PID control to maintain a steady-state.

It will be apparent to those skilled in the art that the pseudo code relating to FIGS. 14–17 and 20–21 can be implemented in an appropriate object-oriented programming language, such as C+ or Java.

The multi-site reaction system of the present invention may find use in many applications. The system may be utilized to perform chemical reactions on samples, e.g., nucleic acid amplification. For example, samples may be mixed with a polynucleotide, a polymerase such as Taq polymerase, nucleoside triphosphates, a first primer hybridizable with the sample polynucleotide, and a second primer hybridizable with a sequence complementary to the polynucleotide. Some or all of the required reagents may be present in the reaction vessel as shipped, or they may be added to the sample and the reaction mixture delivered through the inlet port of the vessel. Alternatively, the reagents may be delivered to the reaction chamber of the vessel independently of the sample. The polymerase chain reaction may be performed according to methods well known in the art.

Although polynucleotide amplification by polymerase chain reaction has been described herein, it will be appreciated by persons skilled in the art that the devices and methods of the present invention may be utilized equally effectively for a variety of other polynucleotide amplification reactions and ligand-binding assays. Such additional reactions may be thermally cycled, such as the polymerase chain reaction, or they may be carried out at a single temperature, e.g., nucleic acid sequenced-based amplification (NASBA). Moreover, such reactions may employ a wide variety of amplification reagents and enzymes, including DNA ligase, T7 RNA polymerase and/or reverse transcriptase, among others. Polynucleotide amplification reactions that may be practiced in the system of the invention include, but are not limited to: (1) target polynucleotide amplification methods such as self-sustained sequence replication (3SR) and strand-displacement amplification (SDA): (2) methods based on amplification of a signal attached to the target polynucleotide, such as "branched chain" DNA amplification; (3) methods based on amplification of probe DNA, such as ligase chain reaction (LCR) and QB replicase amplification (QBR); (4) transcription-based methods, such as ligation activated transcription (LAT) and nucleic acid sequence-based amplification (NASBA); and (5) various other amplification methods, such as repair chain reaction (RCR) and cycling probe reaction (CPR).

In addition to the aforementioned amplification methods, other chemical or biochemical reaction applications are anticipated. For example, temperature controlled lysis of cells is another application of the intended invention, which may or may not compliment amplification methods described above. In many cases, this is accomplished by raising the temperature of the solution containing the cell to 37° C. for a few minutes to allow the action of proteolytic enzymes followed by raising the temperature and holding at 95° C. After a few seconds to minutes, the cell is lysed and the target component, such as nucleic acid, is released and can then be further processed, e.g., amplified. In other applications, it may be desired to immediately stop any further chemical reactions immediately after the lysis by lowering the temperature to 0° to 4° C., such as in the case when studying the mRNA expression state using rapid thermal polymerase chain reaction. The rapid thermal ramping as provided by the system of the invention enables such functionality.

Furthermore, the disclosed apparatus can be utilized to control and interrogate chemical reactions. In enzyme kinetic studies, for example, it is advantageous to hold the test reaction mixture at a reduced temperature, such as 0 to 4° C., before starting the reaction, and then to quickly bring the reaction mixture from this reduced hold temperature, e.g. 4° C., to an optimal reaction temperature. Unwanted side reactions occurring at intermediate temperatures are reduced or eliminated, allowing for more accurate measurements and higher purity of product. Moreover, this approach can be extended to more complex chemical and biochemical reactions that can be controlled and studied by enabling changes to multiple different temperatures, or to periodically reduce the temperature to stop the reactions.

Such temperature control can be exploited for ligand binding reactions such as fluorescence homogenous immunoassays. Because the reaction start event can be precisely executed and the subsequent reaction-hold temperature accurately controlled without thermal gradients, better assay performance may be achieved. Other applications of the invention are intended to be within the scope of the invention where those applications require the transfer of thermal energy to a chemical reaction.

The present invention has been described above in varied detail by reference to particular embodiments and figures. However, it is to be understood that modifications or substitutions may be made to the devices and methods described based upon this disclosure without departing from the broad scope of the invention. Therefore, the scope of the invention should be determined by the following claims and their legal equivalents.

What is claimed is:

1. A system for controlling the temperature of a reaction mixture contained in a reaction vessel, the system comprising:
   a) at least one heating device for heating the vessel;
   b) at least one temperature sensor;
   c) at least one power regulator for regulating an amount of power supplied to the heating device; and
   d) at least one controller in communication with the power regulator and with the temperature sensor, wherein the controller includes program instructions for heating the reaction mixture by:
      i) determining a level of power to be provided to the heating device, wherein the level of power is determined in dependence upon a variable target temperature that initially exceeds a desired setpoint temperature for the mixture;
      ii) sending a control signal instructing the power regulator to provide power to the heating device at the level determined; when the sensor measures a temperature greater than or equal to a threshold temperature,
      iii) decreasing the variable target temperature;
      iv) determining a new level of power to be provided to the heating device, wherein the new level of power is determined in dependence upon the decreased target temperature; and
      v) sending a new control signal instructing the power regulator to provide power to the heating device at the new level.

2. The system of claim 1, wherein the target temperature is decreased to a temperature less than or equal to the desired setpoint temperature.

3. The system of claim 1, wherein the controller includes program instructions for repeating steps (iii) through (v) until the variable target temperature is less than or equal to the desired setpoint temperature.

4. The system of claim 3, wherein the controller includes program instructions for decreasing the variable target temperature by exponentially decaying the amount by which the variable target temperature exceeds the desired setpoint temperature.

5. The system of claim 4, wherein the amount by which the variable target temperature exceeds the desired setpoint temperature is exponentially decayed as a function of time according to the equation:

$$\Delta = (\Delta_{max}) * e^{(-t/tau)}$$

where $\Delta$ is equal to the amount by which the variable target temperature exceeds the desired setpoint temperature, $\Delta_{max}$ is equal to the difference between the initial value of the variable target temperature and the desired setpoint temperature, t is equal to the elapsed time from the start of decay, and tau is equal to a decay time constant.

6. The system of claim 3, wherein the controller includes program instructions for linearly decreasing the variable target temperature.

7. The system of claim 1, further comprising a cooling device for cooling the mixture, wherein the controller further includes program instructions for cooling the mixture by:
   i) setting a second variable target temperature, wherein the second variable target temperature is initially lower than a desired second setpoint temperature for the mixture;
   ii) activating the cooling device to cool the mixture until the sensor measures a temperature less than or equal to a second threshold temperature;
   iii) increasing the second variable target temperature;
   iv) determining another level of power to be provided to the heating device in dependence upon the increased second variable target temperature; and
   v) sending a control signal instructing the power regulator to provide power to the heating device at the level determined.

8. The system of claim 7, wherein the second variable target temperature is increased to a temperature greater than or equal to the second setpoint temperature.

9. The system of claim 7, wherein the controller includes program instructions for repeating steps (iii) through (v) until the second variable target temperature is greater than or equal to the second setpoint temperature.

10. The system of claim 1, further comprising at least one optical detector in communication with the controller for generating optical data regarding the reaction mixture in the vessel, wherein the controller further includes program instructions for adjusting at least one thermal processing parameter in dependence upon the optical data.

11. The system of claim 1, further comprising at least one optical detector in communication with the controller for generating optical data regarding the reaction mixture in the vessel, wherein the controller further includes program instructions for processing the optical data and adjusting at least one process control selected from the group consisting of temperature control, completion of reaction, profile display, and signal generation regarding the need for addition of reagents.

12. The system of claim 1, wherein the temperature sensor is positioned to measure the temperature of the heating device, and wherein the variable target temperature is decreased when the temperature of the heating device is greater than or equal to the threshold temperature.

13. The system of claim 12, wherein the level of power in step (i) is determined in dependence upon the difference between the target temperature and the temperature of the heating device.

14. The system of claim 12, wherein the new level of power is determined in dependence upon the difference between the decreased target temperature and the temperature of the heating device.

15. The system of claim 1, wherein the heating device comprises a plate and a heating element coupled to the plate.

16. The system of claim 15, wherein the temperature sensor is positioned to measure the temperature of the plate, and wherein the power regulator regulates the amount of power supplied to the heating element.

17. A system for controlling the temperature of a reaction mixture contained in a reaction vessel, the system comprising:
   a) at least one heating device for heating the vessel;
   b) at least one cooling device for cooling the vessel;
   c) at least one temperature sensor;
   d) at least one power regulator for regulating an amount of power supplied to the heating device; and
   e) at least one controller in communication with the cooling device, the power regulator, and the temperature sensor, wherein the controller includes program instructions for cooling the mixture by:
      i) setting a variable target temperature, wherein the variable target temperature is initially lower than a desired setpoint temperature for the mixture;
      ii) activating the cooling device to cool the mixture until the sensor measures a temperature less than or equal to a threshold temperature;
      iii) increasing the variable target temperature;
      iv) determining a level of power to be provided to the heating device in dependence upon the increased variable target temperature; and
      v) sending a control signal instructing the power regulator to provide power to the heating device at the level determined.

18. The system of claim 17, wherein the variable target temperature is increased to a temperature greater than or equal to the setpoint temperature.

19. The system of claim 17, wherein the controller includes program instructions for repeating steps (iii) through (v) until the variable target temperature is greater than or equal to the setpoint temperature.

20. The system of claim 17, further comprising at least one optical detector in communication with the controller for generating optical data regarding the reaction mixture in the vessel, wherein the controller further includes program instructions for adjusting at least one thermal processing parameter in dependence upon the optical data.

21. The system of claim 17, further comprising at least one optical detector in communication with the controller for generating optical data regarding the reaction mixture in the vessel, wherein the controller further includes program instructions for processing the optical data and adjusting at least one process control selected from the group consisting of temperature control, completion of reaction, profile display, and signal generation regarding the need for addition of reagents.

22. The system of claim 17, wherein the temperature sensor is positioned to measure the temperature of the heating device.

23. The system of claim 22, wherein the level of power is determined in dependence upon the difference between the increased target temperature and the temperature of the heating device.

24. The system of claim 17, wherein the heating device comprises a plate and a heating element coupled to the plate.

25. The system of claim 24, wherein the temperature sensor is positioned to measure the temperature of the plate, and wherein the power regulator regulates the amount of power supplied to the heating element.

26. A system for controlling the temperature of a reaction mixture contained in a reaction vessel, the system comprising:
   a) at least one heating device for heating the vessel;
   b) at least one temperature sensor for measuring a temperature of the heating device;
   c) at least one power regulator for regulating the amount of power supplied to the heating device;
   d) at least one memory storing:
      i) a pulse intensity value indicating an intensity of a power pulse to be supplied to the heating device to heat the heating device to a desired setpoint temperature; and
      ii) a pulse length value indicating a duration of the power pulse to be supplied to the heating device; and
   e) at least one controller in communication with the memory, the power regulator, and the temperature sensor, wherein the controller includes program instructions for heating the reaction mixture by:
      i) sending a control signal instructing the power regulator to provide the power pulse to the heating device at the intensity and for the duration indicated by the pulse intensity value and the pulse length value, respectively;
      ii) receiving temperature signals from the temperature sensor indicating measured temperatures of the heating device;
      iii) terminating the power pulse when the measured temperature of the heating device reaches a threshold value or when the duration of time indicated by the pulse length value has elapsed; and
      iv) adjusting the pulse length value or the pulse intensity value stored in the memory in dependence upon the difference between the setpoint temperature and the measured temperature of the heating device after the power pulse is completed;
   wherein the system further includes at least one optical detector in communication with the controller for generating optical data regarding the reaction mixture in the vessel, and wherein the controller further includes program instructions for processing the optical data and adjusting at least one process control selected from the group consisting of temperature control, completion of reaction, profile display, and signal generation regarding the need for addition of reagents.

27. The system of claim 26, further comprising a cooling device for cooling the heating device, wherein the memory further stores a cooling length value indicating a duration of time the cooling device is to be activated to cool the heating device to a second setpoint temperature, and the controller further includes program instructions for cooling the mixture by:
   i) activating the cooling device to begin cooling the heating device;

ii) receiving temperature signals from the sensor indicating measured temperatures of the heating device;
iii) deactivating the cooling device when the measured temperature of the heating device decreases to a predetermined value or when the duration of time indicated by the cooling length value has elapsed; and
iv) adjusting the cooling length value stored in the memory in dependence upon the difference between the second setpoint temperature and the measured temperature of the heating device after the active cooling is completed.

28. The system of claim 26, wherein the heating device comprises a plate and a heating element coupled to the plate.

29. The system of claim 26, wherein the controller includes program instructions for processing the optical data and adjusting at least one optical detection parameter in dependence upon the optical data.

30. The system of claim 26, wherein the controller includes program instructions for adjusting at least one thermal processing parameter in dependence upon the optical data.

31. A system for controlling the temperature of a reaction mixture contained in a reaction vessel, the system comprising:
  a) at least one heating device for heating the vessel;
  b) at least one temperature sensor for measuring a temperature of the heating device;
  c) at least one power regulator for regulating the amount of power supplied to the heating device;
  d) at least one memory storing:
    i) a pulse intensity value indicating an intensity of a power pulse to be supplied to the heating device to heat the heating device to a desired setpoint temperature; and
    ii) a pulse length value indicating a duration of the power pulse to be supplied to the heating device; and
  e) at least one controller in communication with the memory, the power regulator, and the temperature sensor, wherein the controller includes program instructions for heating the reaction mixture by:
    i) sending a control signal instructing the power regulator to provide the power pulse to the heating device at the intensity and for the duration indicated by the pulse intensity value and the pulse length value, respectively;
    ii) receiving temperature signals from the temperature sensor indicating measured temperatures of the heating device;
    iii) terminating the power pulse when the measured temperature of the heating device reaches a threshold value or when the duration of time indicated by the pulse length value has elapsed; and
    iv) adjusting the pulse length value or the pulse intensity value stored in the memory in dependence upon the difference between the setpoint temperature and the measured temperature of the heating device after the power pulse is completed;

wherein the system further includes at least one optical detector in communication with the controller for generating optical data regarding the reaction mixture in the vessel, and wherein the controller further includes program instructions for processing the optical data and adjusting at least one optical detection parameter in dependence upon the optical data.

32. The system of claim 31, further comprising a cooling device for cooling the heating device, wherein the memory further stores a cooling length value indicating a duration of time the cooling device is to be activated to cool the heating device to a second setpoint temperature, and the controller further includes program instructions for cooling the mixture by:
  i) activating the cooling device to begin cooling the heating device;
  ii) receiving temperature signals from the sensor indicating measured temperatures of the heating device;
  iii) deactivating the cooling device when the measured temperature of the heating device decreases to a predetermined value or when the duration of time indicated by the cooling length value has elapsed; and
  iv) adjusting the cooling length value stored in the memory in dependence upon the difference between the second setpoint temperature and the measured temperature of the heating device after the active cooling is completed.

33. The system of claim 31, wherein the heating device comprises a plate and a heating element coupled to the plate.

34. The system of claim 31, wherein the controller further includes program instructions for adjusting at least one thermal processing parameter in dependence upon the optical data.

35. A system for thermally controlling a plurality of reaction mixtures contained in a plurality of reaction vessels, the system comprising:
  a) a plurality of heat-exchanging modules for receiving the vessels, wherein each of the modules comprises:
    i) at least one heating device for heating one of the vessels; and
    ii) a temperature sensor for measuring the temperature of the heating device;
  b) at least one power reaulator for regulating the amount of power supplied to the heating device of each heat-exchanging module;
  c) at least one memory storing for each of the heat-exchanging modules:
    i) a pulse intensity value indicating an intensity of a power pulse to be supplied to the heating device to heat the heating device to a desired setpoint temperature; and
    ii) a pulse length value indicating a duration of the power pulse to be supplied to the heating device; and
  d) at least one controller in communication with the memory, the power regulator, and with the temperature sensor of each heat-exchanging module, wherein the controller includes program instructions for independently controlling each heat-exchanging module to heat a reaction mixture by:
    i) sending a control signal instructing the power regulator to provide the power pulse to the heating device at the intensity and for the duration indicated by the pulse intensity value and the pulse length value,
    ii) receiving temperatures signals from the temperature sensor indicating measured temperatures of the heating device;
    iii) terminating the power pulse when the measured temperature of the heating device reaches a threshold value or when the duration of time indicated by the pulse length value has elapsed; and
    iv) adjusting the pulse length value or the pulse intensity value stored in the memory in dependence upon the difference between the setpoint temperature and the measured temperature of the heating device after the power pulse is completed;

wherein each heat-exchanging module further includes a cooling device for cooling the heating device, the memory further stores a cooling length value indicating a duration of time the cooling device is to be activated to cool the heating device to a second setpoint temperature, and the controller further includes program instructions for independently controlling each heat-exchanging module by:
  i) activating the cooling device to begin cooling the heating device;
  ii) receiving temperature signals from the sensor indicating measured temperatures of the heating device;
  iii) deactivating the cooling device when the measured temperature of the heating device decreases to a predetermined value or when the duration of time indicated by the cooling length value has elapsed; and
  iv) adjusting the cooling length value stored in the memory in dependence upon the difference between the second setpoint temperature and the measured temperature of the heating device after the active cooling is completed.

36. A system for thermally controlling a plurality of reaction mixtures contained in a plurality of reaction vessels, the system comprising:
  a) a plurality of heat-exchanging modules for receiving the vessels, wherein each of the modules comprises:
    i) at least one heating device for heating one of the vessels; and
    ii) a temperature sensor for measuring the temperature of the heating device;
  b) at least one power regulator for regulating the amount of power supplied to the heating device of each heat-exchanging module;
  c) at least one memory storing for each of the heat-exchanging modules:
    i) a pulse intensity value indicating an intensity of a power pulse to be supplied to the heating device to heat the heating device to a desired setpoint temperature; and
    ii) a pulse length value indicating a duration of the power pulse to be supplied to the heating device; and
  d) at least one controller in communication with the memory, the power regulator, and with the temperature sensor of each heat-exchanging module, wherein the controller includes program instructions for independently controlling each heat-exchanging module to heat a reaction mixture by:
    i) sending a control signal instructing the power regulator to provide the power pulse to the heating device at the intensity and for the duration indicated by the pulse intensity value and the pulse length value, respectively, stored for the module;
    ii) receiving temperature signals from the temperature sensor indicating measured temperatures of the heating device;
    iii) terminating the power pulse when the measured temperature of the heating device reaches a threshold value or when the duration of time indicated by the pulse length value has elapsed; and
    iv) adjusting the pulse length value or the pulse intensity value stored in the memory in dependence upon the difference between the setpoint temperature and the measured temperature of the heating device after the power pulse is completed;
wherein each heat-exchanging module further includes at least one optical detector in communication with the controller for generating optical data regarding the reaction mixture in the vessel, and wherein the controller further includes program instructions for adjusting at least one thermal processing parameter in dependence upon the optical data.

37. A system for thermally controlling a plurality of reaction mixtures contained in a plurality of reaction vessels, the system comprising:
  a) a plurality of heat-exchanging modules for receiving the vessels, wherein each of the modules comprises:
    i) at least one heating device for heating one of the vessels; and
    ii) a temperature sensor for measuring the temperature of the heating device;
  b) at least one power regulator for regulating the amount of power supplied to the heating device of each heat-exchanging module;
  c) at least one memory storing for each of the heat-exchanging modules:
    i) a pulse intensity value indicating an intensity of a power pulse to be supplied to the heating device to heat the heating device to a desired setpoint temperature; and
    ii) a pulse length value indicating a duration of the power pulse to be supplied to the heating device; and
  d) at least one controller in communication with the memory, the power regulator, and with the temperature sensor of each heat-exchanging module, wherein the controller includes program instructions for independently controlling each heat-exchanging module to heat a reaction mixture by:
    i) sending a control signal instructing the power regulator to provide the power pulse to the heating device at the intensity and for the duration indicated by the pulse intensity value and the pulse length value, respectively, stored for the module;
    ii) receiving temperature signals from the temperature sensor indicating measured temperatures of the heating device;
    iii) terminating the power pulse when the measured temperature of the heating device reaches a threshold value or when the duration of time indicated by the pulse length value has elapsed; and
    iv) adjusting the pulse length value or the pulse intensity value stored in the memory in dependence upon the difference between the setpoint temperature and the measured temperature of the heating device after the power pulse is completed;
wherein each heat-exchanging module further includes at least one optical detector in communication with the controller for generating optical data regarding the reaction mixture in the vessel, and wherein the controller further includes program instructions for processing the optical data and adjusting at least one process control selected from the group consisting of temperature control, completion of reaction, profile display, and signal generation regarding the need for addition of reagents.

38. A method for heating and optically interrogating a reaction mixture, the method comprising the steps of:
  a) storing in at least one memory:
    i) a pulse length value indicating a duration of a power pulse to be supplied to a heating device to heat the reaction mixture to a desired setpoint temperature; and
    ii) a pulse intensity value indicating an intensity of the power pulse to be supplied to the heating device; and
  b) sending a control signal instructing a power regulator to provide the power pulse to the heating device at the intensity and for the duration indicated by the pulse intensity value and the pulse length value, respectively;
c) receiving temperature signals from a sensor indicating measured temperatures of the heating device;
d) terminating the power pulse when the measured temperature of the heating device reaches a threshold value or when the duration of time indicated by the pulse length value has elapsed;
e) adjusting the pulse length value or the pulse intensity value stored in the memory in dependence upon the difference between the setpoint temperature and the measured temperature of the heating device after the power pulse is completed;
f) generating optical data regarding the reaction mixture; and
g) processing the optical data and adjusting at least one optical detection parameter.

39. A method for heating and optically interrogating a reaction mixture, the method comprising the steps of:
a) storing in at least one memory:
  i) a pulse length value indicating a duration of a power pulse to be supplied to a heating device to heat the reaction mixture to a setpoint temperature; and
  ii) a pulse intensity value indicating an intensity of the power pulse to be supplied to the heating device; and
b) sending a control signal instructing a power regulator to provide the power pulse to the heating device at the intensity and for the duration indicated by the pulse intensity value and the pulse length value, respectively;
c) receiving temperature signals from a sensor indicating measured temperatures of the heating device;
d) terminating the power pulse when the measured temperature of the heating device reaches a threshold value or when the duration of time indicated by the pulse length value has elapsed;
e) adjusting the pulse length value or the pulse intensity value stored in the memory in dependence upon the difference between the setpoint temperature and the measured temperature of the heating device after the power pulse is completed;
f) generating optical data regarding the reaction mixture; and
g) processing the optical data and adjusting at least one process control selected from the group consisting of temperature control, completion of reaction, profile display, and signal generation regarding the need for addition of reagents.

40. A method for thermally controlling a plurality of reaction mixtures contained in a plurality of reaction vessels, the method comprising the steps of:
a) placing the reaction vessels into a corresponding plurality of heat-exchanging modules, wherein each of the modules comprises:
  i) at least one heating device for heating one of the vessels; and
  ii) a temperature sensor for measuring the temperature of the heating device;
b) for each of the heat-exchanging modules, storing in at least one memory;
  i) a pulse length value indicating a duration of a power pulse to be supplied to the heating device of the module to heat the heating device to a desired setpoint temperature; and
  ii) a pulse intensity value indicating an intensity of the power pulse to be supplied to the heating device;
c) independently controlling each heat-exchanging module to heat the reaction mixture contained therein by:
  i) sending a control signal instructing a power regulator to provide the power pulse to the heating device at the intensity and for the duration indicated by the pulse intensity value and the pulse length value, respectively, stored for the module;
  ii) receiving temperature signals from the sensor indicating measured temperatures of the heating device;
  iii) terminating the power pulse when the measured temperature of the heating device reaches a threshold value or when the duration of time indicated by the pulse length value has elapsed;
  iv) adjusting the pulse length value or the pulse intensity value stored in the memory in dependence upon the difference between the setpoint temperature and the measured temperature of the heating device after the power pulse is completed;
d) for each of the heat-exchanging modules, generating optical data regarding the reaction mixture in the module; and
e) processing the optical data and adjusting at least one optical detection parameter.

41. A method for thermally controlling a plurality of reaction mixtures contained in a plurality of reaction vessels, the method comprising the steps of:
a) placing the reaction vessels into a corresponding plurality of heat-exchanging modules, wherein each of the modules comprises:
  i) at least one heating device for heating one of the vessels; and
  ii) a temperature sensor for measuring the temperature of the heating device;
b) for each of the heat-exchanging modules, storing in at least one memory:
  i) a pulse length value indicating a duration of a power pulse to be supplied to the heating device of the module to heat the heating device to a desired setpoint temperature; and
  ii) a pulse intensity value indicating an intensity of the power pulse to be supplied to the heating device;
c) independently controlling each heat-exchanging module to heat the reaction mixture contained therein by:
  i) sending a control signal instructing a power regulator to provide the power pulse to the heating device at the intensity and for the duration indicated by the pulse intensity value and the pulse length value, respectively, stored for the module;
  ii) receiving temperature signals from the sensor indicating measured temperatures of the heating device;
  iii) terminating the power pulse when the measured temperature of the heating device reaches a threshold value or when the duration of time indicated by the pulse length value has elapsed;
  iv) adjusting the pulse length value or the pulse intensity value stored in the memory in dependence upon the difference between the setpoint temperature and the measured temperature of the heating device after the power pulse is completed;
d) for each of the heat-exchanging modules, generating optical data regarding the reaction mixture in the module; and
e) processing the optical data and adjusting at least one process control selected from the group consisting of temperature control, completion of reaction, profile display, and signal generation regarding the need for addition of reagents.

* * * * *